United States Patent
Hlavinka et al.

(10) Patent No.: US 9,550,849 B2
(45) Date of Patent: *Jan. 24, 2017

(54) POLYMERS WITH IMPROVED TOUGHNESS AND ESCR FOR LARGE-PART BLOW MOLDING APPLICATIONS

(71) Applicant: Chevron Phillips Chemical Company LP, The Woodlands, TX (US)

(72) Inventors: Mark L. Hlavinka, Tulsa, OK (US); Qing Yang, Bartlesville, OK (US); Yongwoo Inn, Bartlesville, OK (US); William M. Whitte, Bartlesville, OK (US); John R. Rathman, Bartlesville, OK (US); Steven J. Secora, Bartlesville, OK (US); Daniel G. Hert, Owasso, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/995,268

(22) Filed: Jan. 14, 2016

(65) Prior Publication Data

US 2016/0122454 A1   May 5, 2016

Related U.S. Application Data

(63) Continuation of application No. 14/205,422, filed on Mar. 12, 2014, now Pat. No. 9,273,170.

(51) Int. Cl.
| | |
|---|---|
| C08L 23/08 | (2006.01) |
| C08F 4/653 | (2006.01) |
| C08F 4/6592 | (2006.01) |
| C08F 210/16 | (2006.01) |
| C08F 4/659 | (2006.01) |

(52) U.S. Cl.
CPC .......... *C08F 210/16* (2013.01); *C08L 23/0815* (2013.01); *C08F 4/65904* (2013.01); *C08F 4/65916* (2013.01)

(58) Field of Classification Search
CPC .. C08L 23/0815; C08F 4/65904; C08F 210/16
See application file for complete search history.

(56) References Cited

U.S. PATENT DOCUMENTS

| | | |
|---|---|---|
| 3,242,099 A | 3/1966 | Manyik et al. |
| 3,248,179 A | 4/1966 | Norwood |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. |
| 5,310,834 A | 5/1994 | Katzen et al. |
| 5,352,749 A | 10/1994 | DeChellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 5,576,259 A | 11/1996 | Hasegawa et al. |
| 5,739,220 A | 4/1998 | Shamshoum et al. |
| 5,807,938 A | 9/1998 | Kaneko et al. |
| 5,919,983 A | 7/1999 | Rosen et al. |
| 6,107,230 A | 8/2000 | McDaniel et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,524,987 B1 | 2/2003 | Collins et al. |
| 6,548,441 B1 | 4/2003 | McDaniel et al. |
| 6,548,442 B1 | 4/2003 | McDaniel et al. |
| 6,576,583 B1 | 6/2003 | McDaniel et al. |
| 6,613,712 B1 | 9/2003 | McDaniel et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,833,415 B2 | 12/2004 | Kendrick et al. |
| 7,026,494 B1 | 4/2006 | Yang et al. |
| 7,041,617 B2 | 5/2006 | Jensen et al. |
| 7,199,073 B2 | 4/2007 | Martin |
| 7,226,886 B2 | 6/2007 | Jayaratne et al. |
| 7,294,599 B2 | 11/2007 | Jensen et al. |

(Continued)

FOREIGN PATENT DOCUMENTS

| | | |
|---|---|---|
| WO | WO 2007/101053 | 9/2007 |
| WO | WO 2014/134015 | 9/2014 |

OTHER PUBLICATIONS

U.S. Appl. No. 14/848,395, entitled "*Polymers with Improved ESCR for Blow Molding Applications*," filed Sep. 9, 2015.
U.S. Appl. No. 14/848,405, entitled "*Methods for Controlling Die Swell in Dual Catalyst Olefin Polymerization Systems*," filed Sep. 9, 2015.
Modern Plastics Encyclopedia, Mid-Nov. 1995 Issue, vol. 72, No. 12, 3 pages.
Film Extrusion Manual—Process, Materials, Properties, TAPPI Press, 1992, 16 pages.
Hieber et al., "Some correlations involving the shear viscosity of polystyrene melts," Rheologica Acta, 1989, vol. 28, pp. 321-332.

(Continued)

*Primary Examiner* — Caixia Lu
(74) *Attorney, Agent, or Firm* — Merchant & Gould P.C.

(57) ABSTRACT

Disclosed herein are ethylene-based polymers having a density greater than 0.945 g/cm³, a high load melt index less than 25 g/10 min, a peak molecular weight ranging from 52,000 to 132,000 g/mol, and an environmental stress crack resistance of at least 250 hours. These polymers have the processability of chromium-based resins, but with improved impact strength and stress crack resistance, and can be used in large-part blow molding applications.

15 Claims, 5 Drawing Sheets

(56) References Cited

U.S. PATENT DOCUMENTS

| | | |
|---|---|---|
| 7,300,983 B2 | 11/2007 | Degroot et al. |
| 7,312,283 B2 | 12/2007 | Martin et al. |
| 7,517,939 B2 | 4/2009 | Yang et al. |
| 7,601,665 B2 | 10/2009 | McDaniel et al. |
| 7,619,047 B2 | 11/2009 | Yang et al. |
| 7,858,702 B2 | 12/2010 | Jaker |
| 7,884,163 B2 | 2/2011 | McDaniel et al. |
| 7,919,639 B2 | 4/2011 | Murray et al. |
| 8,080,681 B2 | 12/2011 | Murray et al. |
| 8,114,946 B2 | 2/2012 | Yang et al. |
| 8,138,113 B2 | 3/2012 | Yang et al. |
| 8,202,940 B2 | 6/2012 | Jaker et al. |
| 8,309,485 B2 | 11/2012 | Yang et al. |
| 8,318,883 B1 | 11/2012 | Yang et al. |
| 8,383,730 B2 | 2/2013 | Jaker et al. |
| 8,383,754 B2 | 2/2013 | Yang et al. |
| 8,623,973 B1 | 1/2014 | McDaniel et al. |
| 8,912,285 B2 | 12/2014 | Yang et al. |
| 9,156,970 B2 | 10/2015 | Hlavinka et al. |
| 9,169,337 B2 | 10/2015 | Rohatgi et al. |
| 9,175,111 B2 | 11/2015 | Kapur et al. |
| 9,273,170 B2 | 3/2016 | Hlavinka et al. |
| 9,346,897 B2 | 5/2016 | Cui et al. |
| 9,394,393 B2 | 7/2016 | Hlavinka et al. |
| 2004/0059070 A1 | 3/2004 | Whitte |
| 2006/0235171 A1 | 10/2006 | Lee et al. |
| 2007/0043182 A1 | 2/2007 | Martin et al. |
| 2014/0342141 A1 | 11/2014 | Cui et al. |
| 2015/0065669 A1 | 3/2015 | Hlavinka et al. |
| 2015/0259455 A1 | 9/2015 | Hlavinka et al. |
| 2015/0376312 A1 | 12/2015 | Hlavinka et al. |
| 2016/0053035 A1 | 2/2016 | Rohatgi et al. |

OTHER PUBLICATIONS

Hieber et al., "Shear-Rate-Dependence Modeling of Polymer Melt Viscosity," Polymer Engineering and Science, 1992, 32(14), pp. 931-938.

Bird et al., "Dynamics of Polymeric Liquids," vol. 1, Fluid Mechanics, 2nd Edition, John Wiley & Sons, 1987, 3 pages.

Wyatt, "Light scattering and the absolute characterization of macromolecules," Wyatt Technology Corporation, Analytica Chimica Acta, 272, 1993, pp. 1-40.

Janzen et al., "Diagnosing long-chain branching in polyethylenes," Journal of Molecular Structure, 1999, 485-486, pp. 569-584.

Arnett et al., "Zero-Shear Viscosity of Some Ethyl Branched Paraffinic Model Polymers," Journal of Physical Chemistry, 1980, 84(6), pp. 649-652.

Yu, et at. entitled "Long Chain Branches in Metallocene-Catalyzed Polyethylene Determined by a Combination of SEC/Multi-Angle Light Scattering, NMR and Rheology," published in *Polymer Preprints 2003*, vol. 44 (2), pp. 49-50.

Article entitled "SABIC Expands Product Portfolio by Adding Bimodal HDPE Blow Molding Grades for Bottles," published Mar. 5, 2013, 1 page.

Kapur, Mridula (Babli), article entitled "Next Generation HDPE for Blow Molding Applications" published in ANTEC 2009, pp. 65-69.

Marlex® HXB TR-512 Data Sheet, May 2007, 1 page.

Marlex® HXM 50100 Data Sheet, May 2007, 1 page.

International Application PCT/US2015/020079 Search Report dated May 27, 2015; 3 pages.

Molecular Weight Distribution

Dynamic Melt Viscosity vs. Frequency

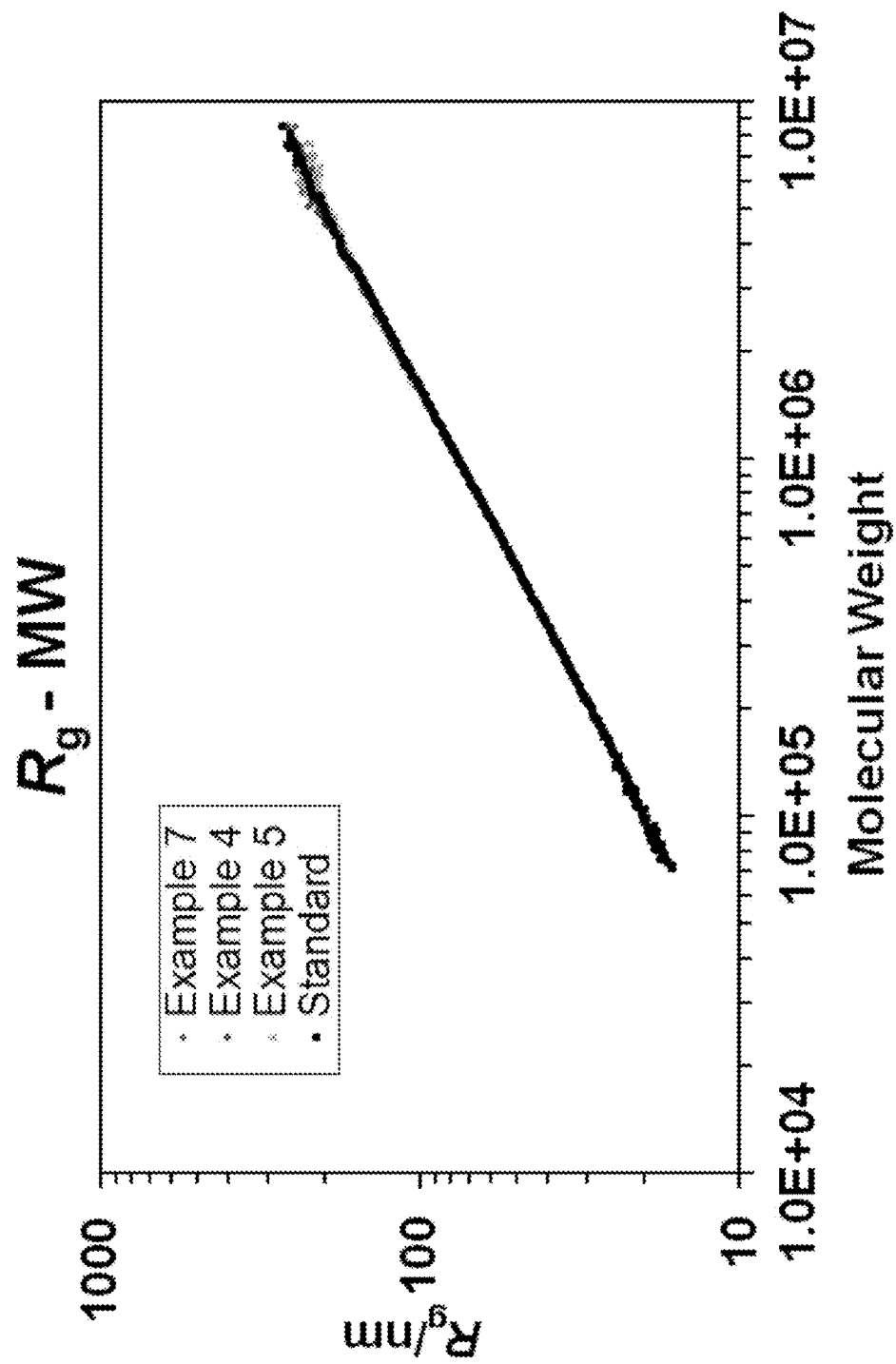

US 9,550,849 B2

POLYMERS WITH IMPROVED TOUGHNESS AND ESCR FOR LARGE-PART BLOW MOLDING APPLICATIONS

CROSS-REFERENCE TO RELATED APPLICATION

This application is a continuation application of U.S. patent application Ser. No. 14/205,422, filed on Mar. 12, 2014, now U.S. Pat. No. 9,273,170, the disclosure of which is incorporated herein by reference in its entirety.

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Chromium-based catalyst systems can, for example, produce olefin polymers having good extrusion processability and polymer melt strength, typically due to their broad molecular weight distribution (MWD).

In some end-use applications, it can be beneficial to have the processability and melt strength similar to that of an olefin polymer produced from a chromium-based catalyst system, as well as improvements in toughness, impact strength, and environmental stress crack resistance (ESCR) at equivalent or higher polymer densities. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to new catalyst compositions, methods for preparing catalyst compositions, methods for using the catalyst compositions to polymerize olefins, the polymer resins produced using such catalyst compositions, and articles produced using these polymer resins. In particular, aspects of the present invention are directed to catalyst compositions employing two metallocene catalyst components. The first catalyst component can comprise an unbridged metallocene compound, for instance, an unbridged zirconium or hafnium based metallocene compound containing two cyclopentadienyl groups, two indenyl groups, or a cyclopentadienyl and an indenyl group. The second catalyst component can comprise a bridged metallocene compound, for instance, a bridged zirconium or hafnium based metallocene compound with a cyclopentadienyl group and a fluorenyl group, and with an alkenyl substituent on the bridging group and/or on the cyclopentadienyl group. Such catalyst compositions can be used to produce, for example, ethylene-based copolymers for variety of end-use applications, such as the blow molding of large parts.

The present invention also contemplates and encompasses olefin polymerization processes. Such processes can comprise contacting a catalyst composition with an olefin monomer and optionally an olefin comonomer under polymerization conditions to produce an olefin polymer. Generally, the catalyst composition employed can comprise any of the catalyst component I (unbridged) metallocene compounds, any of the catalyst component II (bridged) metallocene compounds, and any of the activators and optional cocatalysts disclosed herein. For example, organoaluminum compounds can be utilized in the catalyst compositions and/or polymerization processes.

Polymers produced from the polymerization of olefins, resulting in homopolymers, copolymers, terpolymers, etc., can be used to produce various articles of manufacture. A representative and non-limiting example of an olefin polymer (e.g., an ethylene copolymer) consistent with aspects of this invention can be characterized as having the following properties: a density of greater than or equal to about 0.945 $g/cm^3$, a high load melt index (HLMI) in a range from about 1 to about 25 g/10 min, a peak molecular weight (Mp) in a range from about 52,000 to about 132,000 g/mol, and an environmental stress crack resistance (ESCR) of at least 250 hours. Another representative and non-limiting ethylene-based polymer described herein can have a density of greater than or equal to about 0.945 $g/cm^3$, a high load melt index (HLMI) in a range from about 1 to about 25 g/10 min, a weight-average molecular weight (Mw) in a range from about 275,000 to about 800,000 g/mol, a number-average molecular weight (Mn) in a range from about 20,000 to about 60,000 g/mol, and a ratio of Mw/Mn in a range from about 5 to about 22. These polymers, in further aspects, can be characterized by low levels of long chain branches (LCB), and/or a reverse comonomer distribution, and/or a bimodal molecular weight distribution, and/or high impact resistance, and/or excellent blow molding performance and processability.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

BRIEF DESCRIPTION OF THE FIGURES

FIG. 5 presents a plot of the radius of gyration versus the molecular weight for a linear standard and the polymers of Examples 4, 5, and 7.

DEFINITIONS

Figure 1:
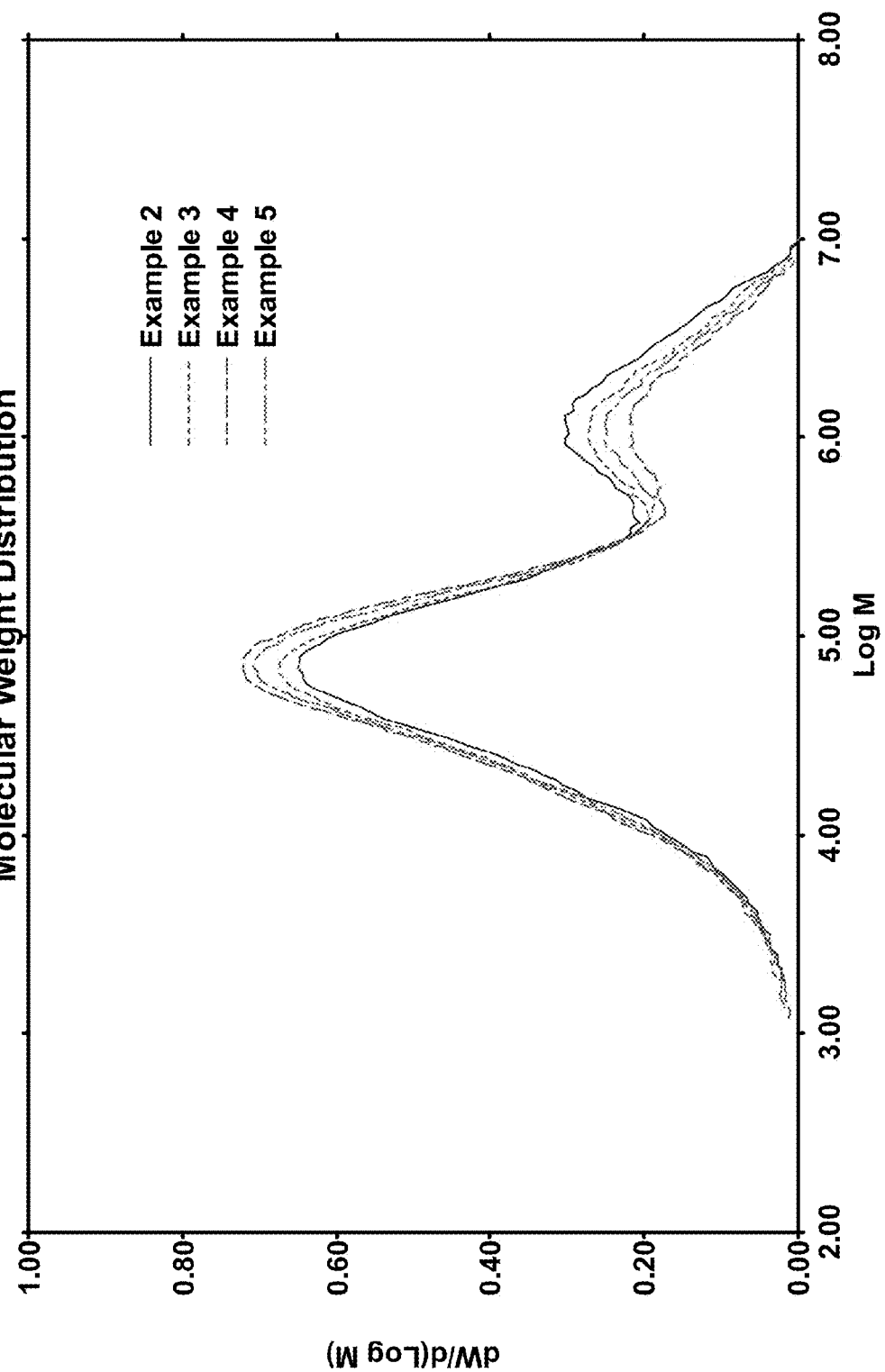
FIG. 1 presents a plot of the molecular weight distributions of the polymers of Examples 2-5.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; (i) catalyst component I, (ii) catalyst component II, (iii) an activator, and (iv) optionally, a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer.

In like manner, the scope of the term "polymerization" includes homopolymerization, copolymerization, terpolymerization, etc. Therefore, a copolymerization process can involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound(s), or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the peak molecular weight (Mp) of an olefin polymer produced in an aspect of this invention. By a disclosure that the Mp can be in a range from about 50,000 to about 130,000 g/mol, Applicants intend to recite that the Mp can be any molecular weight in the range and, for example, can be equal to about 50,000, about 60,000, about 70,000, about 80,000, about 90,000, about 100,000, about 110,000, about 120,000, or about 130,000 g/mol. Additionally, the Mp can be within any range from about 50,000 to about 130,000 (for example, from about 60,000 to about 80,000), and this also includes any combination of ranges between about 50,000 and about 130,000 (for example, the Mp can be in a range from about 52,000 to about 75,000, or from about 90,000 to about 125,000). Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The present invention is directed generally to new catalyst compositions, methods for preparing catalyst compositions, methods for using the catalyst compositions to polymerize olefins, the polymer resins produced using such catalyst compositions, and articles produced using these polymer resins. In particular, the present invention relates to catalyst compositions containing two metallocene components, to polymerization processes utilizing such catalyst compositions, and to the resulting olefin polymers produced from the polymerization processes.

Catalyst Component I

Catalyst component I can comprise an unbridged zirconium or hafnium based metallocene compound and/or an unbridged zirconium and/or hafnium based dinuclear metallocene compound. In one aspect, for instance, catalyst component I can comprise an unbridged zirconium or hafnium based metallocene compound containing two cyclopentadienyl groups, two indenyl groups, or a cyclopentadienyl and an indenyl group. In another aspect, catalyst component I can comprise an unbridged zirconium or hafnium based metallocene compound containing two cyclopentadienyl groups. In yet another aspect, catalyst component I can comprise an unbridged zirconium or hafnium based metallocene compound containing two indenyl groups. In still another aspect, catalyst component I can comprise an unbridged zirconium or hafnium based metallocene compound containing a cyclopentadienyl and an indenyl group.

In some aspects, catalyst component I can comprise an unbridged zirconium based metallocene compound containing two cyclopentadienyl groups, two indenyl groups, or a cyclopentadienyl and an indenyl group, while in other aspects, catalyst component I can comprise a dinuclear unbridged metallocene compound with an alkenyl linking group.

Catalyst component I can comprise, in particular aspects of this invention, an unbridged metallocene compound having formula (I):

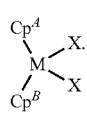
(I)

Within formula (I), M, $Cp^A$, $Cp^B$, and each X are independent elements of the unbridged metallocene compound. Accordingly, the unbridged metallocene compound having formula (I) can be described using any combination of M, $Cp^A$, $Cp^B$, and X disclosed herein.

Unless otherwise specified, formula (I) above, any other structural formulas disclosed herein, and any metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

In accordance with aspects of this invention, the metal in formula (I), M, can be Ti, Zr, or Hf. In one aspect, for instance, M can be Zr or Hf, while in another aspect, M can be Ti; alternatively, M can be Zr; alternatively, M can be Hf.

Each X in formula (I) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, —$OBR^1{}_2$, or —$OSO_2R^1$, wherein $R^1$ is a $C_1$ to $C_{36}$ hydrocarbyl group. It is contemplated that each X can be either the same or a different monoanionic ligand.

In one aspect, each X independently can be H, $BH_4$, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, each X independently can be H, $BH_4$, a halide, $OBR^1{}_2$, or $OSO_2R^1$, wherein $R^1$ is a $C_1$ to $C_{18}$ hydrocarbyl group. In another aspect, each X independently can be H, $BH_4$, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR^1{}_2$, or $OSO_2R^1$, wherein $R^1$ is a $C_1$ to $C_{12}$ hydrocarbyl group. In another aspect, each X independently can be H, $BH_4$, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR^1{}_2$, or $OSO_2R^1$, wherein $R^1$ is a $C_1$ to $C_{10}$ hydrocarbyl group. In yet another aspect, each X independently can be H, $BH_4$, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR^1{}_2$, or $OSO_2R^1$, wherein $R^1$ is a $C_1$ to $C_8$ hydrocarbyl group. In still another aspect, each X independently can be a halide or a $C_1$ to $C_{18}$ hydrocarbyl group. For example, each X can be Cl.

The hydrocarbyl group which can be an X in formula (I) can be a $C_1$ to $C_{36}$ hydrocarbyl group, including, but not limited to, a $C_1$ to $C_{36}$ alkyl group, a $C_2$ to $C_{36}$ alkenyl group, a $C_4$ to $C_{36}$ cycloalkyl group, a $C_6$ to $C_{36}$ aryl group, or a $C_7$ to $C_{36}$ aralkyl group. For instance, each X independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, each X independently can be a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; alternatively, each X independently can be a $C_1$ to $C_{10}$ alkyl group, a $C_2$ to $C_{10}$ alkenyl group, a $C_4$ to $C_{10}$ cycloalkyl group, a $C_6$ to $C_{10}$ aryl group, or a $C_7$ to $C_{10}$ aralkyl group; or alternatively, each X independently can be a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group.

Accordingly, in some aspects, the alkyl group which can be an X in formula (I) can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In some aspects, the alkyl group which can be an X in formula (I) can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group.

Suitable alkenyl groups which can be an X in formula (I) can include, but are not limited to, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, or an octadecenyl group. Such alkenyl groups can be linear or branched, and the double bond can be located anywhere in the chain. In one aspect, each X in formula (I) independently can be an ethenyl group, a propenyl group, a butenyl group, a pentenyl group, a hexenyl group, a heptenyl group, an octenyl group, a nonenyl group, or a decenyl group, while in another aspect, each X in formula (I) independently can be an ethenyl group, a propenyl group, a butenyl group, a pentenyl group, or a hexenyl group. For example, an X can be an ethenyl group; alternatively, a propenyl group; alternatively, a butenyl group; alternatively, a pentenyl group; or alternatively, a hexenyl group. In yet another aspect, an X can be a terminal alkenyl group, such as a $C_3$ to $C_{18}$ terminal alkenyl group, a $C_3$ to $C_{12}$ terminal alkenyl group, or a $C_3$ to $C_8$ terminal alkenyl group. Illustrative terminal alkenyl groups can include, but are not limited to, a prop-2-en-1-yl group, a bute-3-en-1-yl group, a pent-4-en-1-yl group, a hex-5-en-1-yl group, a hept-6-en-1-yl group, an octe-7-en-1-yl group, a non-8-en-1-yl group, a dece-9-en-1-yl group, and so forth.

Each X in formula (I) can be a cycloalkyl group, including, but not limited to, a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. For example, an X in formula (I) can be a cyclopentyl group, a substituted cyclopentyl group, a cyclohexyl group, or a substituted cyclohexyl group. Moreover, each X in formula (I) independently can be a cyclobutyl group or a substituted cyclobutyl group; alternatively, a cyclopentyl group or a substituted cyclopentyl group; alternatively, a cyclohexyl group or a substituted cyclohexyl group; alternatively, a cycloheptyl group or a substituted cycloheptyl group; alternatively, a cyclooctyl group or a substituted cyclooctyl group; alternatively, a cyclopentyl group; alternatively, a substituted cyclopentyl group; alternatively, a cyclohexyl group; or alternatively, a substituted cyclohexyl group. Substituents which can be utilized for the substituted cycloalkyl group are independently disclosed herein and can be utilized without limitation to further describe the substituted cycloalkyl group which can be an X in formula (I).

In some aspects, the aryl group which can be an X in formula (I) can be a phenyl group, a substituted phenyl group, a naphthyl group, or a substituted naphthyl group. In an aspect, the aryl group can be a phenyl group or a substituted phenyl group; alternatively, a naphthyl group or a substituted naphthyl group; alternatively, a phenyl group or a naphthyl group; alternatively, a substituted phenyl group or a substituted naphthyl group; alternatively, a phenyl group; or alternatively, a naphthyl group. Substituents which can be utilized for the substituted phenyl groups or substituted naphthyl groups are independently disclosed herein and can be utilized without limitation to further describe the substituted phenyl groups or substituted naphthyl groups which can be an X in formula (I).

In an aspect, the substituted phenyl group which can be an X in formula (I) can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group. In other aspects, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, a 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be an X group(s) in formula (I).

In some aspects, the aralkyl group which can be an X group in formula (I) can be a benzyl group or a substituted benzyl group. In an aspect, the aralkyl group can be a benzyl group or, alternatively, a substituted benzyl group. Substituents which can be utilized for the substituted aralkyl group are independently disclosed herein and can be utilized without limitation to further describe the substituted aralkyl group which can be an X group(s) in formula (I).

In an aspect, each non-hydrogen substituent(s) for the substituted cycloalkyl group, substituted aryl group, or substituted aralkyl group which can be an X in formula (I) independently can be a $C_1$ to $C_{18}$ hydrocarbyl group; alternatively, a $C_1$ to $C_8$ hydrocarbyl group; or alternatively, a $C_1$ to $C_5$ hydrocarbyl group. Specific hydrocarbyl groups are independently disclosed herein and can be utilized without limitation to further describe the substituents of the substituted cycloalkyl groups, substituted aryl groups, or substituted aralkyl groups which can be an X in formula (I). For instance, the hydrocarbyl substituent can be an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like. Furthermore, the hydrocarbyl substituent can be a benzyl group, a phenyl group, a tolyl group, or a xylyl group, and the like.

A hydrocarboxy group is used generically herein to include, for instance, alkoxy, aryloxy, aralkoxy, -(alkyl, aryl, or aralkyl)-O-(alkyl, aryl, or aralkyl) groups, and —O(CO)-(hydrogen or hydrocarbyl) groups, and these groups can comprise up to about 36 carbon atoms (e.g., $C_1$ to $C_{36}$, $C_1$ to $C_{18}$, $C_1$ to $C_{10}$, or $C_1$ to $C_8$ hydrocarboxy groups). Illustrative and non-limiting examples of hydrocarboxy groups which can be an X in formula (I) can include, but are not limited to, a methoxy group, an ethoxy group, an n-propoxy group, an isopropoxy group, an n-butoxy group, a sec-butoxy group, an isobutoxy group, a tert-butoxy group, an n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, a neo-pentoxy group, a phenoxy group, a toloxy group, a xyloxy group, a 2,4,6-trimethylphenoxy group, a benzoxy group, an acetylacetonate group (acac), a formate group, an acetate group, a stearate group, an oleate group, a benzoate group, and the like. In an aspect, the hydrocarboxy group which can be an X in formula (I) can be a methoxy group; alternatively, an ethoxy group; alternatively, an n-propoxy group; alternatively, an isopropoxy group; alternatively, an n-butoxy group; alternatively, a sec-butoxy group; alternatively, an isobutoxy group; alternatively, a tert-butoxy group; alternatively, an n-pentoxy group; alternatively, a 2-pentoxy group; alternatively, a 3-pentoxy group; alternatively, a 2-methyl-1-butoxy group; alternatively, a tert-pentoxy group; alternatively, a 3-methyl-1-butoxy group, alternatively, a 3-methyl-2-butoxy group; alternatively, a neo-pentoxy group; alternatively, a phenoxy group; alternatively, a toloxy group; alternatively, a xyloxy group; alternatively, a 2,4,6-trimethylphenoxy group; alternatively, a benzoxy group; alternatively, an acetylacetonate group; alternatively, a formate group; alternatively, an acetate group; alternatively, a stearate group; alternatively, an oleate group; or alternatively, a benzoate group.

The term hydrocarbylaminyl group is used generically herein to refer collectively to, for instance, alkylaminyl, arylaminyl, aralkylaminyl, dialkylaminyl, diarylaminyl, diaralkylaminyl, and -(alkyl, aryl, or aralkyl)-N-(alkyl, aryl, or aralkyl) groups, and unless otherwise specified, the hydrocarbylaminyl groups which can be an X in formula (I) can comprise up to about 36 carbon atoms (e.g., $C_1$ to $C_{36}$, $C_1$ to $C_{18}$, $C_1$ to $C_{10}$, or $C_1$ to $C_8$ hydrocarbylaminyl groups). Accordingly, hydrocarbylaminyl is intended to cover both (mono)hydrocarbylaminyl and dihydrocarbylaminyl groups. In some aspects, the hydrocarbylaminyl group which can be an X in formula (I) can be, for instance, a methylaminyl group ($—NHCH_3$), an ethylaminyl group ($—NHCH_2CH_3$), an n-propylaminyl group ($—NHCH_2CH_2CH_3$), an iso-propylaminyl group ($—NHCH(CH_3)_2$), an n-butylaminyl group ($—NHCH_2CH_2CH_2CH_3$), a t-butylaminyl group ($—NHC(CH_3)_3$), an n-pentylaminyl group ($—NHCH_2CH_2CH_2CH_2CH_3$), a neo-pentylaminyl group ($—NHCH_2C(CH_3)_3$), a phenylaminyl group ($—NHC_6H_5$), a tolylaminyl group ($—NHC_6H_4CH_3$), or a xylylaminyl group ($—NHC_6H_3(CH_3)_2$); alternatively, a methylaminyl group; alternatively, an ethylaminyl; alternatively, a propylaminyl group; or alternatively, a phenylaminyl group. In other aspects, the hydrocarbylaminyl group which can be an X in formula (I) can be, for instance, a dimethylaminyl group ($—N(CH_3)_2$), a diethylaminyl group ($—N(CH_2CH_3)_2$), a di-n-propylaminyl group ($—N(CH_2CH_2CH_3)_2$), a di-iso-propylaminyl group ($—N(CH(CH_3)_2)_2$), a di-n-butylaminyl group ($—N(CH_2CH_2CH_2CH_3)_2$), a di-t-butylaminyl group ($—N(C(CH_3)_3)_2$), a di-n-pentylaminyl group ($—N(CH_2CH_2CH_2CH_2CH_3)_2$), a di-neo-pentylaminyl group ($—N(CH_2C(CH_3)_3)_2$), a di-phenylaminyl group ($—N(C_6H_5)_2$), a di-tolylaminyl group ($—N(C_6H_4CH_3)_2$), or a di-xylylaminyl group ($—N(C_6H_3(CH_3)_2)_2$); alternatively, a dimethylaminyl group; alternatively, a di-ethylaminyl group; alternatively, a di-n-propylaminyl group; or alternatively, a di-phenylaminyl group.

In accordance with some aspects disclosed herein, each X independently can be a $C_1$ to $C_{36}$ hydrocarbylsilyl group; alternatively, a $C_1$ to $C_{24}$ hydrocarbylsilyl group; alternatively, a $C_1$ to $C_{18}$ hydrocarbylsilyl group; or alternatively, a $C_1$ to $C_8$ hydrocarbylsilyl group. In an aspect, each hydrocarbyl (one or more) of the hydrocarbylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, a $C_7$ to $C_8$ aralkyl group, etc.). As used herein, hydrocarbylsilyl is intended to cover (mono)hydrocarbylsilyl ($—SiH_2R$), dihydrocarbylsilyl ($—SiHR_2$), and trihydrocarbylsilyl ($—SiR_3$) groups, with R being a hydrocarbyl group. In one aspect, the hydrocarbylsilyl group can be a $C_3$ to $C_{36}$ or a $C_3$ to $C_{18}$ trihydrocarbylsilyl group, such as, for example, a trialkylsilyl group or a triphenylsilyl group. Illustrative and non-limiting examples of hydrocarbylsilyl groups which can be an X group(s) in formula (I) can include, but are not limited to, trimethylsilyl, triethylsilyl, tripropylsilyl (e.g., triisopropylsilyl), tributylsilyl, tripentylsilyl, triphenylsilyl, allyldimethylsilyl, and the like.

A hydrocarbylaminylsilyl group is used herein to refer to groups containing at least one hydrocarbon moiety, at least one N atom, and at least one Si atom. Illustrative and non-limiting examples of hydrocarbylaminylsilyl groups which can be an X can include, but are not limited to —$N(SiMe_3)_2$, —$N(SiEt_3)_2$, and the like. Unless otherwise specified, the hydrocarbylaminylsilyl groups which can be X can comprise up to about 36 carbon atoms (e.g., $C_1$ to $C_{36}$, $C_1$ to $C_{18}$, $C_1$ to $C_{12}$, or $C_1$ to $C_8$ hydrocarbylaminylsilyl groups). In an aspect, each hydrocarbyl (one or more) of the hydrocarbylaminylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, a $C_7$ to $C_8$ aralkyl group, etc.). Moreover, hydrocarbylaminylsilyl is intended to cover —$NH(SiH_2R)$, —$NH(SiHR_2)$, —$NH(SiR_3)$, —$N(SiH_2R)_2$, —$N(SiHR_2)_2$, and —$N(SiR_3)_2$ groups, among others, with R being a hydrocarbyl group.

In an aspect, each X independently can be —$OBR^1_2$ or —$OSO_2R^1$, wherein $R^1$ is a $C_1$ to $C_{36}$ hydrocarbyl group, or alternatively, a $C_1$ to $C_{18}$ hydrocarbyl group. The hydrocarbyl group in $OBR^1_2$ and/or $OSO_2R^1$ independently can be any hydrocarbyl group disclosed herein, such as, for instance, a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; or alternatively, a $C_1$ to $C_8$ alkyl group, a $C_2$ to $C_8$ alkenyl group, a $C_5$ to $C_8$ cycloalkyl group, a $C_6$ to $C_8$ aryl group, or a $C_7$ to $C_8$ aralkyl group.

In one aspect, each X independently can be H, $BH_4$, a halide, or a $C_1$ to $C_{36}$ hydrocarbyl group, hydrocarboxy group, hydrocarbylaminyl group, hydrocarbylsilyl group, or hydrocarbylaminylsilyl group, while in another aspect, each X independently can be H, $BH_4$, or a $C_1$ to $C_{18}$ hydrocarboxy group, hydrocarbylaminyl group, hydrocarbylsilyl group, or hydrocarbylaminylsilyl group. In yet another aspect, each X independently can be a halide; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group. In still another aspect, each X can be H; alternatively, F; alternatively, Cl; alternatively, Br; alternatively, I; alternatively, $BH_4$; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group.

Each X independently can be, in some aspects, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a $C_1$ to $C_{36}$, a $C_1$ to $C_{18}$, a $C_1$ to $C_{12}$, or a $C_1$ to $C_8$ alkoxy, aryloxy, alkylaminyl, dialkylaminyl, trihydrocarbylsilyl, and hydrocarbylaminylsilyl.

Moreover, each X independently can be, in certain aspects, a halide or a $C_1$ to $C_{18}$ hydrocarbyl group; alternatively, a halide or a $C_1$ to $C_8$ hydrocarbyl group; alternatively, F, Cl, Br, I, methyl, benzyl, or phenyl; alternatively, Cl, methyl, benzyl, or phenyl; alternatively, a $C_1$ to $C_{18}$ alkoxy, aryloxy, alkylaminyl, dialkylaminyl, trihydrocarbylsilyl, or hydrocarbylaminylsilyl group; alternatively, a $C_1$ to $C_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (I), $Cp^A$ and $Cp^B$ independently can be a substituted or unsubstituted cyclopentadienyl or indenyl group. In one aspect, $Cp^A$ and $Cp^B$ independently can be an unsubstituted cyclopentadienyl or indenyl group. Alternatively, $Cp^A$ and $Cp^B$ independently can be a substituted indenyl or cyclopentadienyl group, for example, having up to 5 substituents.

If present, each substituent on $Cp^A$ and $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on $Cp^A$ and/or $Cp^B$ can be either the same or a different substituent group. Moreover, each substituent can be at any position on the respective cyclopentadienyl or indenyl ring structure that conforms with the rules of chemical valence. In an aspect, the number of substituents on $Cp^A$ and/or on $Cp^B$ and/or the positions of each substituent on $Cp^A$ and/or on $Cp^B$ are independent of each other. For instance, two or more substituents on $Cp^A$ can be different, or alternatively, each substituent on $Cp^A$ can be the same. Additionally or alternatively, two or more substituents on $Cp^B$ can be different, or alternatively, all substituents on $Cp^B$ can be the same. In another aspect, one or more of the substituents on $Cp^A$ can be different from the one or more of the substituents on $Cp^B$, or alternatively, all substituents on both $Cp^A$ and/or on $Cp^B$ can be the same. In these and other aspects, each substituent can be at any position on the respective cyclopentadienyl or indenyl ring structure. If substituted, $Cp^A$ and/or $Cp^B$ independently can have one substituent, two substituents, three substituents, four substituents, and so forth.

In formula (I), each substituent on $Cp^A$ and/or on $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. In some aspects, each substituent independently can be H; alternatively, a halide; alternatively, a $C_1$ to $C_{18}$ hydrocarbyl group; alternatively, a $C_1$ to $C_{18}$ halogenated hydrocarbyl group; alternatively, a $C_1$ to $C_{18}$ hydrocarboxy group; alternatively, a $C_1$ to $C_{18}$ hydrocarbylsilyl group; alternatively, a $C_1$ to $C_{12}$ hydrocarbyl group or a $C_1$ to $C_{12}$ hydrocarbylsilyl group; or alternatively, a $C_1$ to $C_8$ alkyl group or a $C_3$ to $C_8$ alkenyl group. The halide, $C_1$ to $C_{36}$ hydrocarbyl group, $C_1$ to $C_{36}$ hydrocarboxy group, and $C_1$ to $C_{36}$ hydrocarbylsilyl group which can be a substituent on $Cp^A$ and/or on $Cp^B$ in formula (I) can be any halide, $C_1$ to $C_{36}$ hydrocarbyl group, $C_1$ to $C_{36}$ hydrocarboxy group, and $C_1$ to $C_{36}$ hydrocarbylsilyl group described herein (e.g., as pertaining to X in formula (I)). A substituent on $Cp^A$ and/or on $Cp^B$ in formula (I) can be, in certain aspects, a $C_1$ to $C_{36}$ halogenated hydrocarbyl group, where the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

As a non-limiting example, if present, each substituent on $Cp^A$ and/or $Cp^B$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group (or other substituted aryl group), a benzyl group, a naphthyl group, a trimethylsilyl group, a triisopropylsilyl group, a triphenylsilyl group, or an allyldimethylsilyl group; alternatively, H; alternatively, Cl; alternatively, $CF_3$; alternatively, a methyl group; alternatively, an ethyl group; alternatively, a propyl group; alternatively, a butyl group; alternatively, a pentyl group; alternatively, a hexyl group; alternatively, a heptyl group; alternatively, an octyl group, a nonyl group; alternatively, a decyl group; alternatively, an ethenyl group; alternatively, a propenyl group; alternatively, a butenyl group; alternatively, a pentenyl group; alternatively, a hexenyl group; alternatively, a heptenyl group; alternatively, an octenyl group; alternatively, a nonenyl group; alternatively, a decenyl group; alternatively, a phenyl group; alternatively, a tolyl group; alternatively, a benzyl group; alternatively, a naphthyl group; alternatively, a trimethylsilyl group; alternatively, a triisopropylsilyl group; alternatively, a triphenylsilyl group; or alternatively, an allyldimethylsilyl group.

Illustrative and non-limiting examples of unbridged metallocene compounds having formula (I) and/or suitable for use as catalyst component I can include the following compounds (Ph=phenyl):

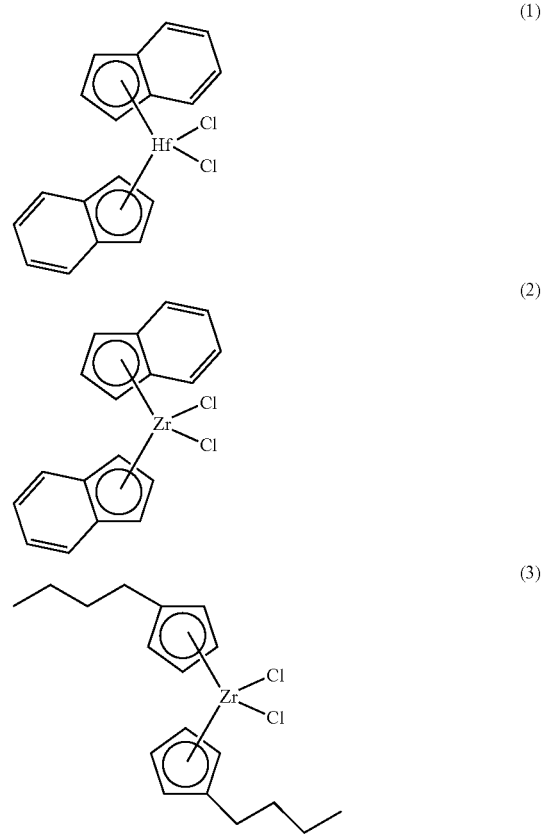

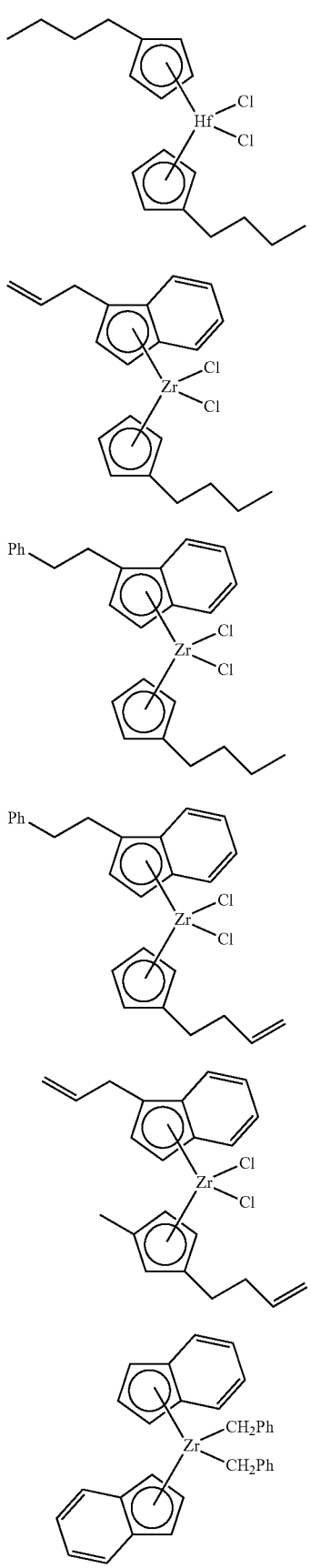

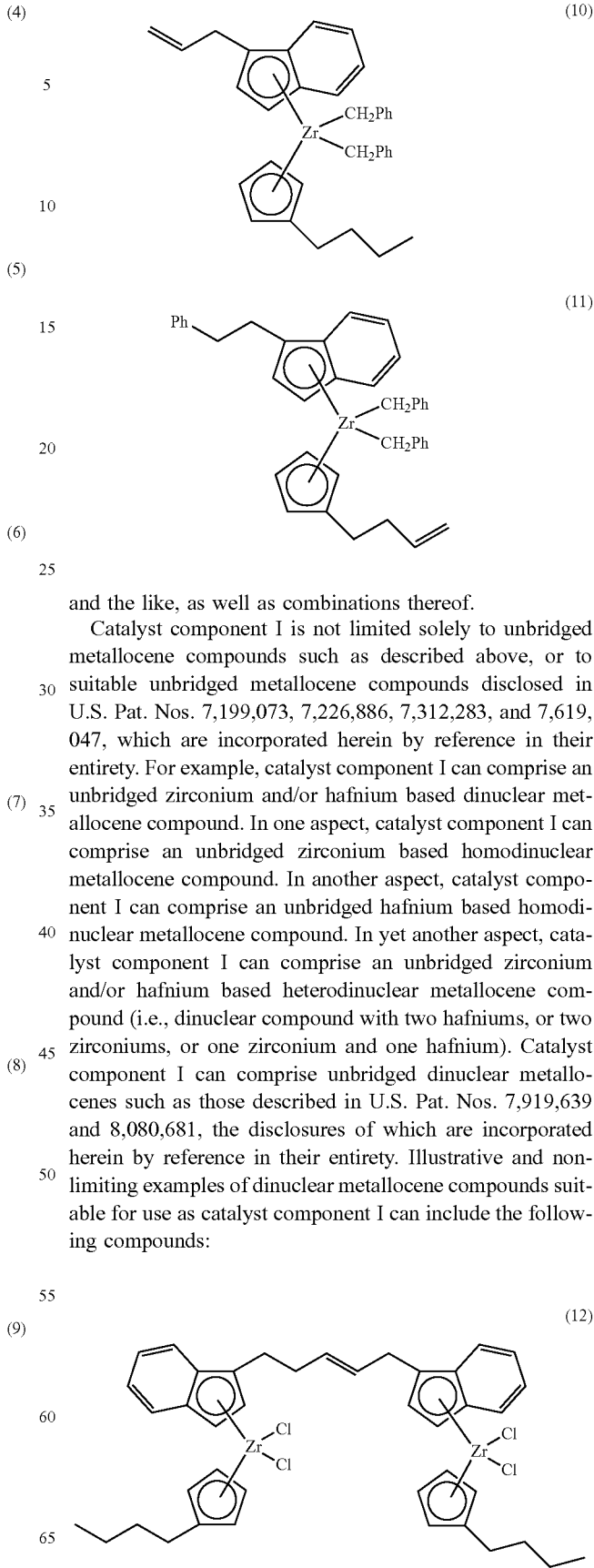

and the like, as well as combinations thereof.

Catalyst component I is not limited solely to unbridged metallocene compounds such as described above, or to suitable unbridged metallocene compounds disclosed in U.S. Pat. Nos. 7,199,073, 7,226,886, 7,312,283, and 7,619,047, which are incorporated herein by reference in their entirety. For example, catalyst component I can comprise an unbridged zirconium and/or hafnium based dinuclear metallocene compound. In one aspect, catalyst component I can comprise an unbridged zirconium based homodinuclear metallocene compound. In another aspect, catalyst component I can comprise an unbridged hafnium based homodinuclear metallocene compound. In yet another aspect, catalyst component I can comprise an unbridged zirconium and/or hafnium based heterodinuclear metallocene compound (i.e., dinuclear compound with two hafniums, or two zirconiums, or one zirconium and one hafnium). Catalyst component I can comprise unbridged dinuclear metallocenes such as those described in U.S. Pat. Nos. 7,919,639 and 8,080,681, the disclosures of which are incorporated herein by reference in their entirety. Illustrative and non-limiting examples of dinuclear metallocene compounds suitable for use as catalyst component I can include the following compounds:

-continued (13)

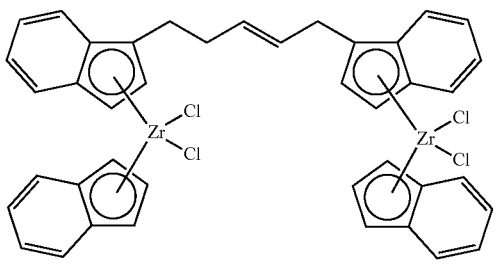

and the like, as well as combinations thereof.

Catalyst Component II

Catalyst component II can comprise a bridged metallocene compound. In one aspect, for instance, catalyst component II can comprise a bridged zirconium or hafnium based metallocene compound. In another aspect, catalyst component II can comprise a bridged zirconium or hafnium based metallocene compound with an alkenyl substituent. In yet another aspect, catalyst component II can comprise a bridged zirconium or hafnium based metallocene compound with an alkenyl substituent and a fluorenyl group. In still another aspect, catalyst component II can comprise a bridged zirconium or hafnium based metallocene compound with a cyclopentadienyl group and a fluorenyl group, and with an alkenyl substituent on the bridging group and/or on the cyclopentadienyl group.

In some aspects, catalyst component II can comprise a bridged metallocene compound having an aryl group substituent on the bridging group, while in other aspects, catalyst component II can comprise a dinuclear bridged metallocene compound with an alkenyl linking group.

Catalyst component II can comprise, in particular aspects of this invention, a bridged metallocene compound having formula (II):

(II)

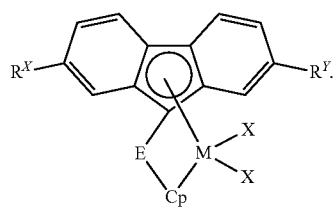

Within formula (II), M, Cp, $R^X$, $R^Y$, E, and each X are independent elements of the bridged metallocene compound. Accordingly, the bridged metallocene compound having formula (II) can be described using any combination of M, Cp, $R^X$, $R^Y$, E, and X disclosed herein.

The selections for M and each X in formula (II) are the same as those described herein above for formula (I). In formula (II), Cp can be a substituted cyclopentadienyl, indenyl, or fluorenyl group. In one aspect, Cp can be a substituted cyclopentadienyl group, while in another aspect, Cp can be a substituted indenyl group.

In some aspects, Cp can contain no additional substituents, e.g., other than bridging group E, discussed further herein below. In other aspects, Cp can be further substituted with one substituent, two substituents, three substituents, four substituents, and so forth. If present, each substituent on Cp independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp can be either the same or a different substituent group. Moreover, each substituent can be at any position on the respective cyclopentadienyl, indenyl, or fluorenyl ring structure that conforms with the rules of chemical valence. In general, any substituent on Cp, independently, can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein (e.g., as pertaining to substituents on $Cp^A$ and $Cp^B$ in formula (I)).

In one aspect, for example, each substituent on Cp independently can be a $C_1$ to $C_{12}$ hydrocarbyl group or a $C_1$ to $C_{12}$ hydrocarbylsilyl group. In another aspect, each substituent on Cp independently can be a $C_1$ to $C_8$ alkyl group or a $C_3$ to $C_8$ alkenyl group. In yet another aspect, each substituent on $Cp^C$ independently can be H, Cl, $CF_3$, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group.

Similarly, $R^X$ and $R^Y$ in formula (II) independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to substituents on $Cp^A$ and $Cp^B$ in formula (I)). In one aspect, for example, $R^X$ and $R^Y$ independently can be H or a $C_1$ to $C_{12}$ hydrocarbyl group. In another aspect, $R^X$ and $R^Y$ independently can be a $C_1$ to $C_{10}$ hydrocarbyl group. In yet another aspect, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group E in formula (II) can be (i) a bridging group having the formula >$E^A R^A R^B$, $E^A$ wherein $E^A$ can be C, Si, or Ge, and $R^A$ and $R^B$ independently can be H or a $C_1$ to $C_{18}$ hydrocarbyl group; (ii) a bridging group having the formula —$CR^C R^D$—$CR^E R^F$—, wherein $R^C$, $R^D$, $R^E$, and $R^F$ independently can be H or a $C_1$ to $C_{18}$ hydrocarbyl group; or (iii) a bridging group having the formula —$SiR^G R^H$—$E^5 R^I R^J$—, wherein $E^5$ can be C or Si, and $R^G$, $R^H$, $R^I$, and $R^J$ independently can be H or a $C_1$ to $C_{18}$ hydrocarbyl group.

In the first option, the bridging group E can have the formula >$E^A R^A R^B$, wherein $E^A$ can be C, Si, or Ge, and $R^A$ and $R^B$ independently can be H or any $C_1$ to $C_{18}$ hydrocarbyl group disclosed herein. In some aspects of this invention, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In these and other aspects, $R^A$ and $R^B$ can be either the same or different.

In the second option, the bridging group E can have the formula $-CR^CR^D-CR^ER^F-$, wherein $R^C$, $R^D$, $R^E$, and $R^F$ independently can be H or any $C_1$ to $C_{18}$ hydrocarbyl group disclosed herein. For instance, $R^C$, $R^D$, $R^E$, and $R^F$ independently can be H or a methyl group.

In the third option, the bridging group E can have the formula $-SiR^GR^H-E^5R^IR^J-$, wherein $E^5$ can be C or Si, and $R^G$, $R^H$, $R^I$, and $R^J$ independently can be H or any $C_1$ to $C_{18}$ hydrocarbyl group disclosed herein. For instance, $E^5$ can be Si, and $R^G$, $R^H$, $R^I$, and $R^J$ independently can be H or a methyl group.

Illustrative and non-limiting examples of bridged metallocene compounds having formula (II) and/or suitable for use as catalyst component II can include the following compounds (Me=methyl, Ph=phenyl; t-Bu=tert-butyl):

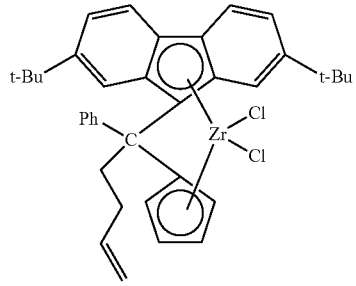

(14)

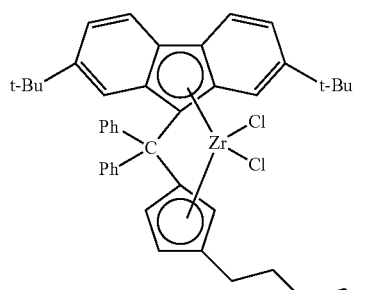

(15)

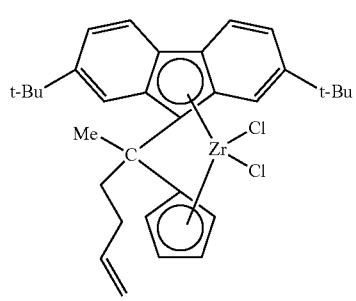

(16)

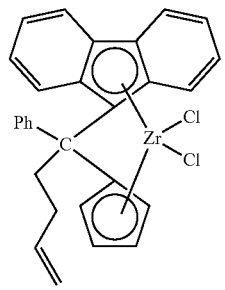

(17)

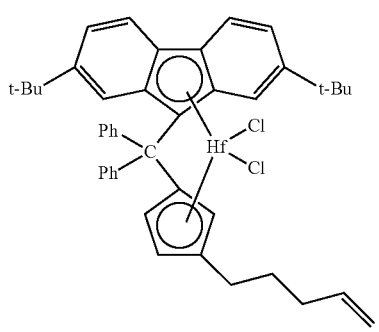

(18)

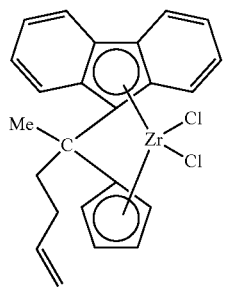

(19)

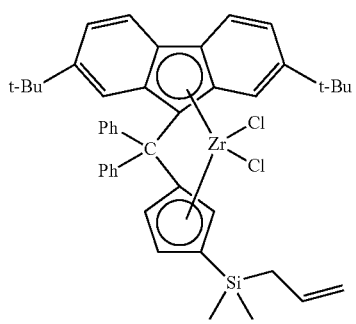

(20)

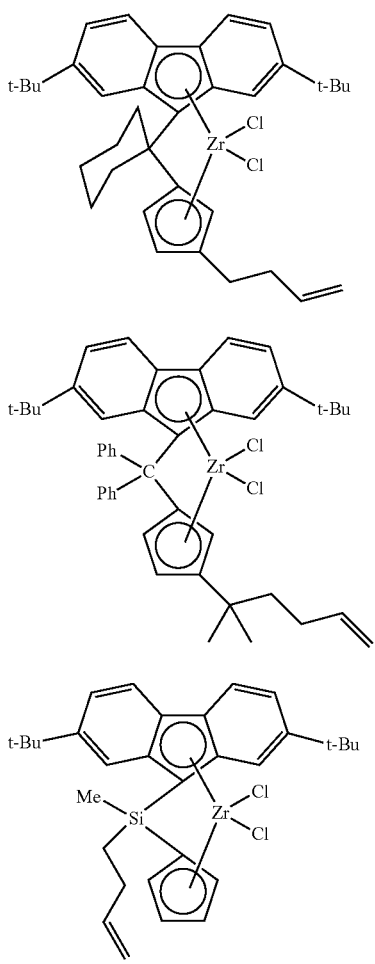
(21)
(22)
(23)
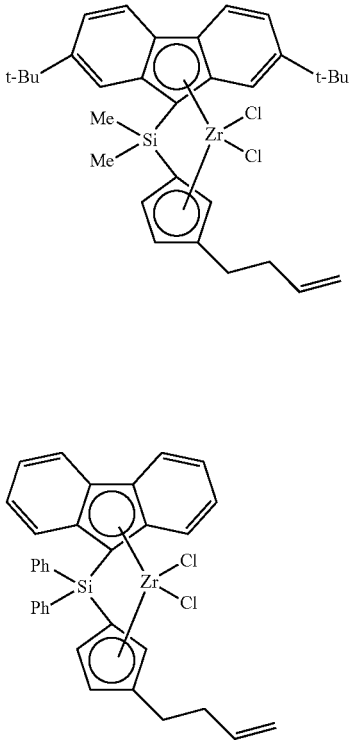
(24)
(25)
and the like, as well as combinations thereof.
Further examples of bridged metallocene compounds having formula (II) and/or suitable for use as catalyst component II can include, but are not limited to, the following compounds:
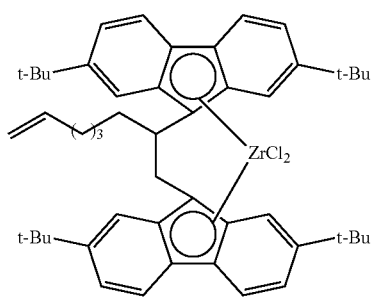
(26)
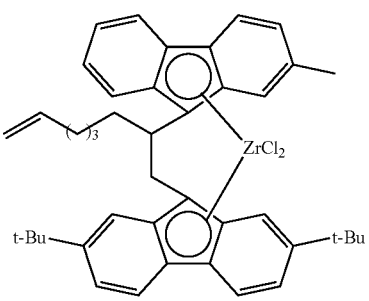
(27)
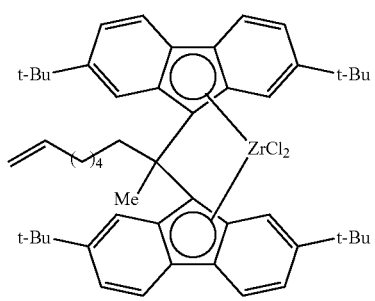
(28)

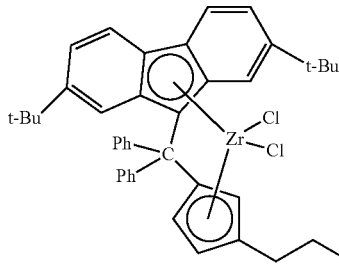
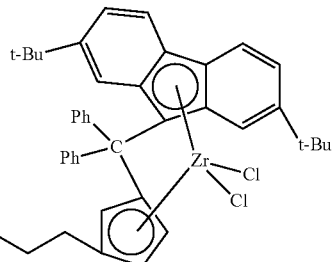

(29)

and the like, as well as combinations thereof.

Catalyst component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047, which are incorporated herein by reference in their entirety.

Activator-Supports

The present invention encompasses various catalyst compositions containing an activator-support. In one aspect, the activator-support can comprise a solid oxide treated with an electron-withdrawing anion. Alternatively, in another aspect, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, 8,309,485, and 8,623,973, which are incorporated herein by reference in their entirety.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from about 5 to about 95% by weight. In one aspect, the silica content of these solid oxides can be from about 10 to about 80%, or from about 20% to about 70%, silica by weight. In another aspect, such materials can have silica contents ranging from about 15% to about 60%, or from about 25% to about 50%, silica by weight. The solid oxides contemplated herein can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The activator-support generally can contain from about 1 to about 25 wt. % of the electron-withdrawing anion, based on the weight of the activator-support. In particular aspects provided herein, the activator-support can contain from about 1 to about 20 wt. %, from about 2 to about 20 wt. %, from about 3 to about 20 wt. %, from about 2 to about 15 wt. %, from about 3 to about 15 wt. %, from about 3 to about 12 wt. %, or from about 4 to about 10 wt. %, of the electron-withdrawing anion, based on the total weight of the activator-support.

In an aspect, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof. In another aspect, the activator-support employed in the catalyst systems described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. In yet another aspect, the activator-support can comprise fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided silica-zirconia; alternatively, sulfated silica-coated alumina; or alternatively, fluorided silica-coated alumina.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, etc.) are well known to those of skill in the art.

Co-Catalysts

In certain aspects directed to catalyst compositions containing a co-catalyst, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth. The hydrocarbyl group (or alkyl group) can be any hydrocarbyl (or alkyl) group disclosed herein. Moreover, in some aspects, the metal of the metal hydrocarbyl can be a group 1, 2, 11, 12, 13, or 14 metal; alternatively, a group 13 or 14 metal; or alternatively, a group 13 metal. Hence, in some aspects, the metal of the metal hydrocarbyl (non-halide metal hydrocarbyl or metal hydrocarbyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium or calcium; alternatively, lithium; alternatively, sodium; alternatively, potassium; alternatively, magnesium; alternatively, calcium; alternatively, zinc; alternatively, boron; alternatively, aluminum; or alternatively, tin. In some aspects, the metal hydrocarbyl or metal alkyl, with or without a halide, can comprise a lithium hydrocarbyl or alkyl, a magnesium hydrocarbyl or alkyl, a boron hydrocarbyl or alkyl, a zinc hydrocarbyl or alkyl, or an aluminum hydrocarbyl or alkyl.

In particular aspects directed to catalyst compositions containing a co-catalyst (e.g., the activator can comprise a solid oxide treated with an electron-withdrawing anion), the co-catalyst can comprise an aluminoxane compound, an organoboron or organoborate compound, an ionizing ionic compound, an organoaluminum compound, an organozinc compound, an organomagnesium compound, or an organolithium compound, and this includes any combinations of these materials. In one aspect, the co-catalyst can comprise an organoaluminum compound. In another aspect, the co-catalyst can comprise an aluminoxane compound, an organoboron or organoborate compound, an ionizing ionic compound, an organozinc compound, an organomagnesium compound, an organolithium compound, or any combination thereof. In yet another aspect, the co-catalyst can comprise an aluminoxane compound; alternatively, an organoboron or organoborate compound; alternatively, an ionizing ionic compound; alternatively, an organozinc compound; alternatively, an organomagnesium compound; or alternatively, an organolithium compound.

Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoboron/organoborate compounds include N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, tris(pentafluorophenyl)boron, tris[3,5-bis(trifluoromethyl)phenyl]boron, and the like, or mixtures thereof.

Examples of ionizing ionic compounds can include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis (pentafluorophenyl) borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2,4-dimethylphenyl)aluminate, potassium tetrakis(3,5-dimethylphenyl)aluminate, potassium tetrafluoroaluminate, and the like, or combinations thereof.

Exemplary organozinc compounds which can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof.

Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium propoxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combinations thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl)methyllithium, allyllithium, and the like, or combinations thereof.

Co-catalysts that can be used in the catalyst compositions of this invention are not limited to the co-catalysts described above. Other suitable co-catalysts are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof alternatively, the comonomer can comprise 1-butene, 1-hexene, 1-octene, or any combination thereof alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent of the comonomer based on the total weight of the monomer and comonomer. According to another aspect of the present invention, the amount of comonomer introduced into a polymerization reactor system can be from about 0.01 to about 40 weight percent comonomer based on the total weight of the monomer and comonomer. In still another aspect, the amount of comonomer introduced into a polymerization reactor system can be from about 0.1 to about 35 weight percent comonomer based on the total weight of the monomer and comonomer. Yet, in another aspect, the amount of comonomer introduced into a polymerization reactor system can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Catalyst Compositions

In some aspects, the present invention can employ catalyst compositions containing catalyst component I, catalyst component II, an activator (one or more than one), and optionally, a co-catalyst. These catalyst compositions can be utilized to produce polyolefins—homopolymers, copolymers, and the like—for a variety of end-use applications. Catalyst components I are II are discussed hereinabove. In aspects of the present invention, it is contemplated that the catalyst composition can contain more than one catalyst component I metallocene compound, and/or more than one catalyst component II metallocene compound. Further, additional catalytic compounds—other than those specified as catalyst component I or II—can be employed in the catalyst compositions and/or the polymerization processes, provided that the additional catalytic compound(s) does not detract from the advantages disclosed herein. Additionally, more than one activator also may be utilized.

The metallocene compounds of catalyst component I are discussed hereinabove. For instance, in some aspects, catalyst component I can comprise (or consist essentially of, or consist of) an unbridged metallocene compound having formula (I). The bridged metallocene compounds of catalyst component II also are discussed hereinabove. For instance, in some aspects, catalyst component II can comprise (or consist essentially of, or consist of) a metallocene compound having formula (II).

Generally, catalyst compositions of the present invention can comprise catalyst component I, catalyst component II, and an activator. In aspects of the invention, the activator can comprise an activator-support (e.g., an activator-support comprising a solid oxide treated with an electron-withdrawing anion). Activator-supports useful in the present invention are disclosed hereinabove. Optionally, such catalyst compositions can further comprise one or more than one co-catalyst compound or compounds (suitable co-catalysts, such as organoaluminum compounds, also are discussed hereinabove). Thus, a catalyst composition of this invention can comprise catalyst component I, catalyst component II, an activator-support, and an organoaluminum compound. For instance, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof alternatively, the activator-support can comprise (or consist essentially of, or consist of) a fluorided solid oxide and/or a sulfated solid oxide. Additionally, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof. Accordingly, a catalyst composition consistent with aspects of the invention can comprise (or consist essentially of, or consist of) an unbridged zirconium or hafnium based metallocene compound; a bridged zirconium or hafnium based metallocene compound with a fluorenyl group; sulfated alumina (or fluorided silica-alumina, or fluorided silica-coated alumina); and triethylaluminum (or triisobutylaluminum).

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed below, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

However, in other aspects of this invention, these activators/co-catalysts can be employed. For example, a catalyst composition comprising catalyst component I, catalyst component II, and an activator-support can further comprise an optional co-catalyst. Suitable co-catalysts in this aspect can include, but are not limited to, aluminoxane compounds, organoboron or organoborate compounds, ionizing ionic compounds, organoaluminum compounds, organozinc compounds, organomagnesium compounds, organolithium compounds, and the like, or any combination thereof or alternatively, organoaluminum compounds, organozinc compounds, organomagnesium compounds, organolithium compounds, or any combination thereof. More than one co-catalyst can be present in the catalyst composition.

In a different aspect, a catalyst composition is provided which does not require an activator-support. Such a catalyst composition can comprise catalyst component I, catalyst component II, and an activator, wherein the activator comprises an aluminoxane compound, an organoboron or organoborate compound, an ionizing ionic compound, or combinations thereof.

In a particular aspect contemplated herein, the catalyst composition is a catalyst composition comprising an activator (one or more than one), only one catalyst component I metallocene compound, and only one catalyst component II metallocene compound. In these and other aspects, the catalyst composition can comprise an activator (e.g., an activator-support comprising a solid oxide treated with an electron-withdrawing anion); only one unbridged zirconium or hafnium based metallocene compound; and only one bridged zirconium or hafnium based metallocene compound with a fluorenyl group.

This invention further encompasses methods of making these catalyst compositions, such as, for example, contacting the respective catalyst components in any order or sequence.

According to an aspect of this invention, the weight ratio of catalyst component I to catalyst component II in the catalyst composition can be in a range from about 10:1 to about 1:10, from about 8:1 to about 1:8, from about 5:1 to about 1:5, from about 4:1 to about 1:4, from about 3:1 to about 1:3; from about 2:1 to about 1:2, from about 1.5:1 to about 1:1.5, from about 1.25:1 to about 1:1.25, or from about 1.1:1 to about 1:1.1.

Generally, the weight ratio of organoaluminum compound to activator-support can be in a range from about 10:1 to about 1:1000. If more than one organoaluminum compound and/or more than one activator-support are employed, this ratio is based on the total weight of each respective component. In another aspect, the weight ratio of the organoaluminum compound to the activator-support can be in a range from about 3:1 to about 1:100, or from about 1:1 to about 1:50.

In some aspects of this invention, the weight ratio of metallocene compounds (total of catalyst component I and II) to activator-support can be in a range from about 1:1 to about 1:1,000,000. If more than one activator-support is employed, this ratio is based on the total weight of the activator-support. In another aspect, this weight ratio can be in a range from about 1:5 to about 1:100,000, or from about 1:10 to about 1:10,000. Yet, in another aspect, the weight ratio of the metallocene compounds to the activator-support can be in a range from about 1:20 to about 1:1000.

Catalyst compositions of the present invention generally have a catalyst activity greater than about 100 grams of polyethylene (homopolymer, copolymer, etc., as the context requires) per gram of activator-support per hour (abbreviated g/g/hr). In another aspect, the catalyst activity can be greater than about 150, greater than about 250, or greater than about 500 g/g/hr. In still another aspect, catalyst compositions of this invention can be characterized by having a catalyst activity greater than about 550, greater than about 650, or greater than about 750 g/g/hr. Yet, in another aspect, the catalyst activity can be greater than about 1000 g/g/hr, greater than about 2000 g/g/hr, or greater than about 3000 g/g/hr, and often as high as 5000-10,000 g/g/hr. Illustrative and non-limiting ranges for the catalyst activity include from about 150 to about 10,000, from about 500 to about 7,500, or from about 1,000 to about 5,000 g/g/hr, and the like. These activities are measured under slurry polymerization conditions, with a triisobutylaluminum co-catalyst, using isobutane as the diluent, at a polymerization temperature of about 90° C. and a reactor pressure of about 390 psig. Moreover, in some aspects, the activator-support can comprise sulfated alumina, fluorided silica-alumina, or fluorided silica-coated alumina, although not limited thereto.

Polymerization Processes

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise catalyst component I, catalyst component II, an activator, and an optional co-catalyst. Catalyst components I and II are discussed herein. For instance, catalyst component I can comprise an unbridged metallocene compound having formula (I), and catalyst component II can comprise a bridged metallocene compound having formula (II).

In accordance with one aspect of the invention, the polymerization process can employ a catalyst composition comprising catalyst component I, catalyst component II, and an activator, wherein the activator comprises an activator-support. Activator-supports useful in the polymerization processes of the present invention are disclosed herein. The catalyst composition, optionally, can further comprise one or more than one organoaluminum compound or compounds (or other suitable co-catalyst). Thus, a process for polymerizing olefins in the presence of a catalyst composition can employ a catalyst composition comprising catalyst component I, catalyst component II, an activator-support, and an organoaluminum compound. In some aspects, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof or alternatively a fluorided solid oxide and/or a sulfated solid oxide. In some aspects, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof.

In accordance with another aspect of the invention, the polymerization process can employ a catalyst composition comprising catalyst component I, catalyst component II, an activator-support, and an optional co-catalyst, wherein the co-catalyst can comprise an aluminoxane compound, an organoboron or organoborate compound, an ionizing ionic compound, an organoaluminum compound, an organozinc compound, an organomagnesium compound, or an organolithium compound, or any combination thereof. Hence, aspects of this invention are directed to a process for polymerizing olefins in the presence of a catalyst composition, the processes comprising contacting a catalyst composition with an olefin monomer and optionally an olefin comonomer (one or more) under polymerization conditions to produce an olefin polymer, and the catalyst composition can comprise catalyst component I, catalyst component II, an activator-support, and an aluminoxane compound; alternatively, catalyst component I, catalyst component II, an activator-support, and an organoboron or organoborate compound; alternatively, catalyst component I, catalyst component II, an activator-support, and an ionizing ionic compound; alternatively, catalyst component I, catalyst component II, an activator-support, and an organoaluminum compound; alternatively, catalyst component I, catalyst component II, an activator-support, and an organozinc compound; alternatively, catalyst component I, catalyst component II, an activator-support, and an organomagnesium compound; or alternatively, catalyst component I, catalyst component II, an activator-support, and an organolithium compound. Furthermore, more than one co-catalyst can be employed, e.g., an organoaluminum compound and an aluminoxane compound, an organoaluminum compound and an ionizing ionic compound, etc.

In accordance with another aspect of the invention, the polymerization process can employ a catalyst composition comprising only one catalyst component I metallocene compound, only one catalyst component II metallocene compound, an activator-support, and an organoaluminum compound.

In accordance with yet another aspect of the invention, the polymerization process can employ a catalyst composition comprising catalyst component I, catalyst component II, and an activator, wherein the activator comprises an aluminoxane compound, an organoboron or organoborate compound, an ionizing ionic compound, or combinations thereof.

The catalyst compositions of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under polymerization conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor system can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can fall within a range from about 70° C. to about 100° C., or from about 75° C. to about 95° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

Aspects of this invention are directed to olefin polymerization processes comprising contacting a catalyst composition with an olefin monomer and an optional olefin comonomer under polymerization conditions to produce an olefin polymer. The olefin polymer (e.g., ethylene copolymer) produced by the process can have any of the polymer properties disclosed herein, for example, a density of greater than or equal to about 0.945 g/cm$^3$, and/or a high load melt index (HLMI) in a range from about 1 to about 25 g/10 min, and/or a peak molecular weight (Mp) in a range from about 52,000 to about 132,000 g/mol, and/or an environmental stress crack resistance (ESCR) of at least 250 hours, and/or a weight-average molecular weight (Mw) in a range from about 275,000 to about 800,000 g/mol, and/or a number-average molecular weight (Mn) in a range from about 20,000 to about 60,000 g/mol, and/or a ratio of Mw/Mn in a range from about 5 to about 22, and/or low levels of long chain branches (LCB), and/or a reverse comonomer distribution, and/or a bimodal molecular weight distribution.

Aspects of this invention also are directed to olefin polymerization processes conducted in the absence of added hydrogen. An olefin polymerization process of this invention can comprise contacting a catalyst composition with an olefin monomer and optionally an olefin comonomer in a polymerization reactor system under polymerization conditions to produce an olefin polymer, wherein the catalyst composition can comprise catalyst component I, catalyst component II, an activator, and an optional co-catalyst, and wherein the polymerization process is conducted in the absence of added hydrogen (no hydrogen is added to the polymerization reactor system). As one of ordinary skill in the art would recognize, hydrogen can be generated in-situ by metallocene catalyst compositions in various olefin polymerization processes, and the amount generated can vary depending upon the specific catalyst composition and metallocene compound(s) employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a catalyst composition with an olefin monomer and optionally an olefin comonomer in a polymerization reactor system under polymerization conditions to produce an olefin polymer, wherein the catalyst composition comprises catalyst component I, catalyst component II, an activator, and an optional co-catalyst, and wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The added hydrogen to olefin monomer ratio in the process can be controlled at a weight ratio which falls within a range from about 25 ppm to about 1500 ppm, from about 50 to about 1000 ppm, or from about 100 ppm to about 750 ppm.

In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio within a range from about 5 ppm up to about 1000 ppm or so, and maintained at the ratio to within about +/−25% during the polymerization run. For instance, if the target ratio is 100 ppm, then maintaining the hydrogen:olefin monomer ratio substantially constant would entail maintaining the feed ratio between about 75 ppm and about 125 ppm. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers (e.g., ethylene/α-olefin copolymers) produced by any of the polymerization processes disclosed herein. Articles of manufacture can be formed from, and/or can comprise, the polymers produced in accordance with this invention.

Polymers and Articles

Certain aspects of this invention are directed to improved polyolefin resins for blow molding applications, as compared to conventional resins produced using chromium-based catalyst systems. Conventional chromium-based resins for blow molding applications generally have a broad MWD, acceptable die/weight swell, high melt strength and hang time, and overall excellent processability on a wide range of blow molding machinery. Notwithstanding these benefits, improvements in toughness, impact strength, and ESCR are desired. Olefin polymers described herein, in certain aspects, can provide a unique combination of the ease of processing typically associated with conventional chromium-based resins (e.g., acceptable die/weight swell, high melt strength and hang time, etc.), along with improvements in toughness, impact strength, and ESCR over conventional chromium-based resins. Such improvements can result in blow molded parts or articles with longer lifetimes, and may allow processors the opportunity to downgauge or thin-wall the blow molded parts or articles, resulting in decreased resin usage and cost reduction.

Olefin polymers encompassed herein can include any polymer produced from any olefin monomer and comonomer(s) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the ethylene polymers of this invention, whose typical properties are provided below.

An illustrative and non-limiting example of an ethylene polymer of the present invention can have a density of greater than or equal to about 0.945 g/cm$^3$, a high load melt index (HLMI) in a range from about 1 to about 25 g/10 min, a peak molecular weight (Mp) in a range from about 52,000 to about 132,000 g/mol, and an environmental stress crack resistance (ESCR) of at least 250 hours. Another illustrative and non-limiting example of an ethylene polymer of the present invention can have a density of greater than or equal to about 0.945 g/cm$^3$, a high load melt index (HLMI) in a range from about 1 to about 25 g/10 min, a weight-average molecular weight (Mw) in a range from about 275,000 to about 800,000 g/mol, a number-average molecular weight (Mn) in a range from about 20,000 to about 60,000 g/mol, and a ratio of Mw/Mn in a range from about 5 to about 22. These illustrative and non-limiting examples of ethylene polymers consistent with the present invention also can have any of the polymer properties listed below and in any combination.

Polymers of ethylene (homopolymers, copolymers, etc.) produced in accordance with some aspects of this invention generally can have a melt index (MI) from 0 to about 0.6 g/10 min. Melt indices in the range from 0 to about 0.5, from 0 to about 0.25, from 0 to about 0.2, or from 0 to about 0.15 g/10 min, are contemplated in other aspects of this invention. For example, a polymer of the present invention can have a MI in a range from 0 to about 0.1, or from 0 to about 0.05 g/10 min.

Consistent with certain aspects of this invention, ethylene polymers described herein can have a high load melt index (HLMI) in a range from about 1 to about 25, from about 1 to about 20, from about 2 to about 25, or from about 2 to about 20 g/10 min. In further aspects, ethylene polymers described herein can have a HLMI in a range from about 1 to about 15, from about 2 to about 15, from about 1 to about 10, or from about 2 to about 10 g/10 min.

The densities of ethylene-based polymers produced using the catalyst systems and processes disclosed herein often are greater than or equal to about 0.94 g/cm$^3$, for example, greater than or equal to about 0.945, greater than or equal to about 0.948, or greater than or equal to about 0.952 g/cm$^3$, and often can range up to about 0.968 g/cm$^3$. Yet, in particular aspects, the density can be in a range from about 0.945 to about 0.965, such as, for example, from about 0.947 to about 0.962, from about 0.95 to about 0.965, from about 0.952 to about 0.962, or from about 0.952 to about 0.96 g/cm$^3$.

Generally, polymers produced in aspects of the present invention are essentially linear or have very low levels of long chain branching, with typically less than about 0.01 long chain branches (LCB) per 1000 total carbon atoms, and similar in LCB content to polymers shown, for example, in U.S. Pat. Nos. 7,517,939, 8,114,946, and 8,383,754, which are incorporated herein by reference in their entirety. In other aspects, the number of LCB per 1000 total carbon atoms can be less than about 0.008, less than about 0.007, less than about 0.005, or less than about 0.003 LCB per 1000 total carbon atoms. These LCB contents are for the 500,000 to 5,000,000 g/mol molecular weight range of the polymer, using the analytical procedure described herein.

Consistent with aspects of this disclosure, ethylene polymers can have an environmental stress crack resistance (ESCR) of at least 250 hours. Moreover, in some aspects, the ethylene polymers described herein can have an ESCR of at least 500 hours, at least 750 hours, at least 1,000 hours, at least 1,500 hours, at least 1,750 hours, or at least 2,000 hours, and often can range as high as 2,500 to 4,000 hours. The ESCR test is typically stopped after a certain number of hours is reached, and given the long duration of the test, the upper limit of ESCR (in hours) is generally not determined. ESCR testing and test results disclosed herein are in accordance with ASTM D1693, condition B, 10% igepal, which is a much more stringent test than ESCR testing conducted using a 100% igepal solution.

Often, the ethylene polymer can have a Tensile Impact of greater than or equal to about 400, greater than or equal to about 450, greater than or equal to about 500, greater than or equal to about 550, or greater than or equal to about 600 kJ/m$^2$. Representative non-limiting ranges include the following: from about 400 to about 1000, from about 400 to about 800, from about 450 to about 1000, from about 450 to about 800, from about 500 to about 1000, from about 500 to about 800, or from about 600 to about 1000 kJ/m$^2$, and the like. In some aspects, the ethylene polymers of this invention can have a Charpy Impact in a range from about 25 to about 75, from about 30 to about 80, from about 25 to about 70, from about 30 to about 70, from about 30 to about 65, from about 28 to about 68, or from about 32 to about 72 kJ/m$^2$.

Ethylene copolymers, for example, produced using the polymerization processes and catalyst systems described hereinabove can, in some aspects, have a reverse comonomer distribution, generally, the higher molecular weight components of the polymer have higher comonomer incorporation than the lower molecular weight components. Typically, there is increasing comonomer incorporation with increasing molecular weight. In one aspect, the number of short chain branches (SCB) per 1000 total carbon atoms of the polymer can be greater at Mw than at Mn. In another aspect, the number of SCB per 1000 total carbon atoms of the polymer can be greater at Mz than at Mw. In yet another aspect, the number of SCB per 1000 total carbon atoms of the polymer can be greater at Mz than at Mn. In still another aspect, the number of SCB per 1000 total carbon atoms of the polymer at a molecular weight of $10^6$ can be greater than at a molecular weight of $10^5$.

Ethylene polymers, such as homopolymers, copolymers, etc., consistent with various aspects of the present invention generally can have a peak molecular weight (Mp), for instance, in a range from about 50,000 to about 130,000, from about 52,000 to about 132,000, from about 55,000 to about 130,000, or from about 55,000 to about 120,000 g/mol. In some aspects, the ethylene polymer can have a Mp in a range from about 65,000 to about 120,000, from about 60,000 to about 130,000, from about 60,000 to about 120,000, or from about 65,000 to about 115,000 g/mol, and the like.

In an aspect, ethylene polymers described herein can have a ratio of Mw/Mn, or the polydispersity index, in a range from about 5 to about 22, from about 5 to about 20, from about 6 to about 20, from about 6 to about 18, from about 6 to about 16, or from about 6 to about 14. In another aspect, ethylene polymers described herein can have a Mw/Mn in a range from about 7 to about 22, from about 7 to about 20, from about 7 to about 18, or from about 7 to about 15.

In an aspect, ethylene polymers described herein can have a ratio of Mz/Mw in a range from about 3.5 to about 8.5, from about 3.5 to about 8, from about 4 to about 8.5, or from about 4 to about 8. In another aspect, ethylene polymers described herein can have a Mz/Mw in a range from about 3.5 to about 7.5, from about 4 to about 7.5, or from about 4 to about 7.

In an aspect, ethylene polymers described herein can have a weight-average molecular weight (Mw) in a range from about 275,000 to about 800,000, from about 300,000 to about 750,000, from about 325,000 to about 650,000, from about 325,000 to about 600,000, or from about 325,000 to about 575,000 g/mol. In another aspect, ethylene polymers described herein can have a Mw in a range from about 325,000 to about 550,000, from about 350,000 to about 750,000, from about 375,000 to about 650,000, or from about 375,000 to about 550,000 g/mol.

In an aspect, ethylene polymers described herein can have a viscosity-average molecular weight (Mv) in a range from about 225,000 to about 600,000, from about 225,000 to about 550,000, from about 250,000 to about 600,000, from about 250,000 to about 550,000, or from about 250,000 to about 450,000 g/mol.

In an aspect, ethylene polymers described herein can have a number-average molecular weight (Mn) in a range from about 20,000 to about 60,000, from about 20,000 to about 55,000, or from about 25,000 to about 60,000 g/mol. In another aspect, ethylene polymers described herein can have a Mn in a range from about 25,000 to about 55,000, from about 30,000 to about 60,000, from about 30,000 to about 55,000, or from about 30,000 to about 50,000 g/mol.

In an aspect, ethylene polymers described herein can have a z-average molecular weight (Mz) in a range from about 1,500,000 to about 10,000,000, from about 1,750,000 to about 7,500,000, or from about 1,750,000 to about 5,000,000 g/mol. In another aspect, ethylene polymers described herein can have a Mz in a range from about 1,750,000 to about 4,000,000, or from about 2,000,000 to about 4,000,000 g/mol.

In an aspect, ethylene polymers described herein can have a CY-a parameter at 190° C. in a range from about 0.06 to about 0.45, from about 0.08 to about 0.4, from about 0.08 to about 0.35, or from about 0.1 to about 0.35. Additionally or alternatively, ethylene polymers described herein can have a zero-shear viscosity at 190° C. of greater than or equal to about $5 \times 10^5$, greater than or equal to about $7.5 \times 10^5$, greater than or equal to about $1 \times 10^6$, in a range in a range from about $7.5 \times 10^5$ to about $1 \times 10^9$, or in a range from about $1 \times 10^6$ to about $1 \times 10^9$ Pa-sec. Additionally or alternatively, ethylene polymers described herein can have a viscosity at 100 sec$^{-1}$ (eta @ 100 or $\eta$@100) at 190° C. in a range from about 1800 to about 4000, from about 2000 to about 4000, from about 1800 to about 3800, from about 2000 to about 3800, from about 1800 to about 3500, or from about 2000 to about 3500 Pa-sec. These rheological parameters were determined at 190° C. using the Carreau-Yasuda (CY) empirical model with creep adjustment, as described herein, with the exception of Example 1, where the parameters were determined without creep adjustment.

Aspects of this invention also are directed to the performance of the ethylene polymer (e.g., an ethylene/1-hexene copolymer) on representative blow molding equipment, as described herein below. Ethylene polymers described herein can have a hang time in a range from about 10 to about 40, from about 10 to about 35, from about 12 to about 40, from about 14 to about 40, from about 14 to about 35, from about 12 to about 35, or from about 14 to about 30 sec. Additionally or alternatively, ethylene polymers described herein can have a part weight in a range from about 1700 to about 3000, from about 1800 to about 2600, from about 1700 to about 2600, from about 1700 to about 2500, or from about 1800 to about 2500 g. Additionally or alternatively, ethylene polymers described herein can have a layflat in a range from about 8 to about 12, from about 8 to about 11, from about 9 to about 12, or from about 9 to about 11 inches.

Ethylene polymers consistent with certain aspects of the invention often can have a bimodal molecular weight distribution (as determined using gel permeation chromatography (GPC) or other suitable analytical technique). Often, in a bimodal molecular weight distribution, there is a valley between the peaks, and the peaks can be separated or deconvoluted. Typically, a bimodal molecular weight distribution can be characterized as having an identifiable high molecular weight component (or distribution) and an identifiable low molecular weight component (or distribution). Illustrative unimodal MWD curves and bimodal MWD curves are shown in U.S. Pat. No. 8,383,754, incorporated herein by reference in its entirety.

In an aspect, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Polymers of ethylene, whether homopolymers, copolymers, and so forth, can be formed into various articles of manufacture. Articles which can comprise polymers of this invention include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein, and the article of manufacture can be a blow molded article.

Applicants also contemplate a method for forming or preparing an article of manufacture comprising a polymer produced by any of the polymerization processes disclosed herein. For instance, a method can comprise (i) contacting a catalyst composition with an olefin monomer and an optional olefin comonomer under polymerization conditions in a polymerization reactor system to produce an olefin polymer, wherein the catalyst composition can comprise catalyst component I, catalyst component II, an activator (e.g., an activator-support comprising a solid oxide treated with an electron-withdrawing anion), and an optional co-catalyst (e.g., an organoaluminum compound); and (ii) forming an article of manufacture comprising the olefin polymer. The forming step can comprise blending, melt processing, extruding, molding (e.g., blow molding), or thermoforming, and the like, including combinations thereof.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Polymer density was determined in grams per cubic centimeter (g/cm$^3$) on a compression molded sample, cooled at about 15° C. per hour, and conditioned for about 40 hours at room temperature in accordance with ASTM D1505 and ASTM D4703. ESCR was determined in accordance with ASTM D1693, condition B, with 10% igepal. Tensile Impact was determined in accordance with ASTM D1822, and Charpy Impact was determined in accordance with ISO 179-1.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, Mv is the viscosity-average molecular weight, and Mp is the peak molecular weight (location, in molecular weight, of the highest point of the molecular weight distribution curve).

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—η$_0$, characteristic viscous relaxation time—τ$_\eta$, and the breadth parameter—a. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
η$_0$=zero shear viscosity;
τ$_\eta$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hassager, *Dynamics of Polymeric Liquids, Volume 1, Fluid Mechanics*, 2nd Edition, John Wiley & Sons (1987); each of which is incorporated herein by reference in its entirety.

A creep adjustment was used to extend the low frequency range of rheological characterization to $10^{-4}$ sec$^{-1}$. In the creep test, a constant shear stress $\sigma_0$ was applied to the specimen and the shear strain $\gamma$ was recorded as a function of creep time t. Although the time-dependent data generated by the creep and creep recovery tests look different from the frequency-dependent data measured in the dynamic frequency sweep test, as long as the measurements are performed in the linear viscoelastic regime, these two experimental data sets contain the same rheological information, so that the time-dependent creep compliance data can be transformed into the frequency-dependent dynamic data, and thus the long time creep measurement can supplement the low frequency data of the dynamic frequency sweep measurement.

The generalized Voigt model was used for modeling the time-dependent creep compliance $J(t)=\gamma(t)/\sigma_0$ in terms of a discrete spectrum $J_k$ of retardation times $\tau_k$ and zero shear rate viscosity $\eta_0$, $$J(t) = \sum_{k=1}^{N} J_k(1 - e^{-t/\tau_k}) + \frac{t}{\eta_0}.$$

If the discrete retardation spectrum accurately describes the compliance data, the theory of linear viscoelasticity permits a quantitative description of other types of experimental data, for example, the storage and the loss compliance calculated as $$J'(\omega) = \sum_{k=1}^{N} J_k \frac{1}{1+\omega^2\tau_k^2}, J''(\omega) = \frac{1}{\omega\eta_0} + \sum_{k=1}^{N} J_k \frac{\omega\tau_k}{1+\omega^2\tau_k^2}.$$

From the relationship between the complex modulus and the complex compliance, the storage and loss modulus of dynamic frequency sweep data can be obtained as $$G'(\omega) = \frac{J'(\omega)}{[J'(\omega)]^2 + [J''(\omega)]^2}, G'(\omega) = \frac{J''(\omega)}{[J'(\omega)]^2 + [J''(\omega)]^2}.$$

As a simple numerical approach to obtain the discrete spectrum of retardation times, the Microsoft Excel Solver tool can be used by minimizing the following objective function O.

$$O = \sum_{i=1}^{N} \frac{[J_{exp}(t_i) - J_{model}(t_i)]^2}{[J_{exp}(t_i)]^2}.$$

For reliable conversion of the time-dependent creep data into the frequency-dependent dynamic data, the frequency range needs to be limited by the testing time of the creep measurement. If it is possible to obtain precise experimental data over the entire range of creep time until the creep compliance reaches the steady state, the exact function of retardation spectra over the entire range of time scale also can be calculated. However, it is often not practical to obtain such data for high molecular weight polymers, which have very long relaxation times. The creep data only contain information within a limited range of time, so that the frequency range is limited by the duration time $t_N$ of the creep test, i.e., valid information for frequencies is in the range of $\omega > t_N^{-1}$, and the extrapolated data outside this frequency range can be influenced by artifacts of the fittings.

For the rheological measurements involving a creep adjustment, the polymer samples were compression molded at 182° C. for a total of 3 min. The samples were allowed to melt at a relatively low pressure for 1 min and then subjected to a high molding pressure for an additional 2 min. The molded samples were then quenched in a room temperature press, and then 25.4 mm diameter disks were stamped out of the molded slabs for the measurement in the rotational rheometer. The measurements were performed in parallel plates of 25 mm diameter at 190° C. using a controlled-stress rheometer equipped with an air bearing system (Physica MCR-500, Anton Paar). The test chamber of the rheometer was purged with nitrogen to minimize oxidative degradation. After thermal equilibration, the specimens were squeezed between the plates to a 1.6 mm thickness, and the excess was trimmed. A total of 8 min elapsed between the time the sample was inserted and the time the test was started. For the dynamic frequency sweep measurement, small-strain (1~10%) oscillatory shear in the linear viscoelastic regime was applied at angular frequencies from 0.0316 to 316 sec$^{-1}$. The creep test was performed for 10,200 sec (170 min) to limit the overall testing time within 4 hr, since sample throughput and thermal stability were concerns. By converting the time dependent creep data to frequency dependent dynamic data, the low frequency range was extended down to $10^{-4}$ rad/sec, two orders of magnitude lower than the frequency range of the dynamic test. The complex viscosity ($|\eta^*|$) versus frequency ($\omega$) data were curve fitted using the Carreau-Yasuda model.

One of the major concerns in performing the creep test, and indeed any long time scale measurement, was that the sample does not appreciably change during the measurement, which may take several hours to perform. If a polymer sample is heated for long time period without proper thermal stabilization (e.g., antioxidants), changes in the polymer can occur that can have a significant effect on the rheological behavior of the polymer and its characterization. Polymers which are being tested should have thermal stability for at least 4-5 hr at 190° C. under nitrogen; for example, ethylene polymers containing at least 0.4 wt. % of antioxidants were found to be stable enough to obtain valid creep adjustment data.

For the rheological measurement in the parallel plates, the specimen was squeezed between the plates to a 1.6 mm thickness, and then the excess was trimmed. When the sample was trimmed with large forces on one direction, some residual stress was generated to cause the strain to drift. Therefore, performing the creep test right after sample trimming should be avoided, because the residual stress can affect the subsequent creep measurement, particularly for the highly viscoelastic resins having long relaxation times. If the applied stress of the creep test is not large enough, the resulting strain can be so small that the creep results can be influenced by the artifact of the strain drifting. In order to minimize this effect, samples were trimmed as gently as possible, and the creep test was conducted after 2000 sec of waiting time, in order to allow relaxation of any residual stress.

The appropriate magnitude of applied stress $\sigma_0$ is important for reliable creep data. The stress $\sigma_0$ must be sufficiently small such that the strain will stay within the linear viscoelastic regime, and it must be sufficiently large such that the strain signal is strong enough to provide satisfactory resolution of data for good precision. Although not limited thereto, a suitable applied stress was equal to the complex modulus |G*| at a frequency of 0.01 rad/sec multiplied by 0.04.

SEC-MALS combines the methods of size exclusion chromatography (SEC) with multi-angle light scattering (MALS) detection. A DAWN EOS 18-angle light scattering photometer (Wyatt Technology, Santa Barbara, Calif.) was attached to a PL-210 SEC system (Polymer Labs, now Agilent) or a Waters 150 CV Plus system (Milford, Mass.) through a hot transfer line, thermally controlled at the same temperature as the SEC columns and its differential refractive index (DRI) detector (145° C.). At a flow rate setting of 0.7 mL/min, the mobile phase, 1,2,4-trichlorobenzene (TCB), was eluted through three, 7.5 mm×300 mm, 20 µm Mixed A-LS columns (Polymer Labs, now Agilent). Polyethylene (PE) solutions with concentrations of ~1.2 mg/mL, depending on samples, were prepared at 150° C. for 4 hr before being transferred to the SEC injection vials sitting in a carousel heated at 145° C. For polymers of higher molecular weight, longer heating times were necessary in order to obtain true homogeneous solutions. In addition to acquiring a concentration chromatogram, seventeen light-scattering chromatograms at different angles were also acquired for each injection using Wyatt's Astra® software. At each chromatographic slice, both the absolute molecular weight (M) and root mean square (RMS) radius, also known as radius of gyration (Rg) were obtained from a Debye plot's intercept and slope, respectively. Methods for this process are detailed in Wyatt, P. J., *Anal. Chim. Acta*, 272, 1 (1993), which is incorporated herein by reference in its entirety.

The Zimm-Stockmayer approach was used to determine the amount of LCB. Since SEC-MALS measures M and Rg at each slice of a chromatogram simultaneously, the branching indices, $g_M$, as a function of M could be determined at each slice directly by determining the ratio of the mean square Rg of branched molecules to that of linear ones, at the same M, as shown in following equation (subscripts br and lin represent branched and linear polymers, respectively).

$$g_M = \frac{\langle R_g \rangle^2_{br}}{\langle R_g \rangle^2_{lin}}.$$

At a given $g_M$, the weight-averaged number of LCB per molecule ($B_{3w}$) was computed using Zimm-Stockmayer's equation, shown in the equation below, where the branches were assumed to be trifunctional, or Y-shaped.

$$g_M = \frac{6}{B_{3w}} \left\{ \frac{1}{2} \left( \frac{2+B_{3w}}{B_{3w}} \right)^{1/2} \ln \left[ \frac{(2+B_{3w})^{1/2} + (B_{3w})^{1/2}}{(2+B_{3w})^{1/2} - (B_{3w})^{1/2}} \right] - 1 \right\}.$$

LCB frequency ($LCB_{Mi}$), the number of LCB per 1000 C, of the $i^{th}$ slice was then computed straightforwardly using the following equation ($M_i$ is the MW of the $i^{th}$ slice):

$$LCB_{Mi} = 1000 * 14 * B_{3w}/M_i.$$

The LCB distribution (LCBD) across the molecular weight distribution (MWD) was thus established for a full polymer.

Short chain branch (SCB) content and short chain branching distribution (SCBD) across the molecular weight distribution can be determined via an IR5-detected GPC system (IR5-GPC), wherein the GPC system is a PL220 GPC/SEC system (Polymer Labs, an Agilent company) equipped with three Styragel HMW-6E columns (Waters, MA) for polymer separation. A thermoelectric-cooled IR5 MCT detector (IR5) (Polymer Char, Spain) is connected to the GPC columns via a hot-transfer line. Chromatographic data are obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions are set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell are set at 150° C., while the temperature of the electronics of the IR5 detector is set at 60° C. Short chain branching content is determined via an in-house method using the intensity ratio of $CH_3$ ($I_{CH3}$) to $CH_2$ ($I_{CH2}$) coupled with a calibration curve. The calibration curve is a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) is used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution are obtained for resins fractionated by the IR5-GPC system under exactly the same chromatographic conditions as for these SCB standards. A relationship between the intensity ratio and the elution volume is converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Blow molding evaluations of Examples 1-9 were performed on a Kautex KB-25 blow molding machine with the following specifications. These particular equipment and processing conditions were chosen because the blow molding performance and properties so obtained are typically representative of those obtained from larger, commercial scale blow molding operations. The extruder screw diameter was 80 mm, the L/D Ratio was 20:1, the drive motor was a 60 HP DC drive, and the maximum plasticizing capacity was about 330 lb polyethylene per hr. The extruder was equipped with a dynicso pressure indicator, three heating zones with air cooling, and a liquid cooled, grooved liner in the feed zone for processing high molecular weight polyethylene pellet and powder resins.

The accumulator head (FIFO Design) had a maximum shot capacity of 8.5 lb, a die bushing diameter maximum and minimum of 8" and 2" (respectively), where 2" thru 3½" is converging, and 4" thru 8" is diverging. The blow molding machine was also equipped with a 100 point Hunkar programmer.

For Examples 1-9, all extruder and head zones were set at 405° F. The mold was a 9-gallon bottle (Fremont Plastics Mold), and 4.5" diverging die head with a 30 degree land angle was used. A constant extrusion pressure was used. The mold temperature was 50-60° F. The timer settings were a 0.5 sec blow delay, a 0 sec preblow, and a 0 sec mold close delay. Air pressure was 90 psig. The minimum wall thickness of the parts was in the 45-50 mil range, and the die gap was 0.196". Parts were produced at an extruder speed of 30 RPM and a blow time of 90 sec.

The weight of the bottle produced (part weight) was recorded, and the width of the flashing at the bottom of the bottle (layflat bottom) was measured. Die swell (parison size versus die size) and weight swell (change in part weight at constant die gap and parison speed) were determined. The melt strengths of the polymers were compared via a hang time test using a 0.089" die gap and 20 RPM extruder speed. A parison was extruded and allowed to hang; the extruder speed was turned to zero while the parison was hanging. The time from the end of the shot to the time the parison tore away from the bushing was recorded as the hang time.

Fluorided silica-coated alumina activator-supports used in Examples 2-8 were prepared as follows. Bohemite was obtained from W. R. Grace & Company under the designation "Alumina A" and having a surface area of about 300 m²/g, a pore volume of about 1.3 mL/g, and an average particle size of about 100 microns. The alumina was first calcined in dry air at about 600° C. for approximately 6 hours, cooled to ambient temperature, and then contacted with tetraethylorthosilicate in isopropanol to equal 25 wt. % SiO₂. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina was collected and stored under dry nitrogen, and was used without exposure to the atmosphere.

Pilot plant polymerizations were conducted in a 23-gallon slurry loop reactor at a production rate of approximately 33 pounds of polymer per hour. Polymerization runs were carried out under continuous particle form process conditions in a loop reactor (also referred to as a slurry process) by contacting a dual metallocene solution in isobutane, an organoaluminum solution (triisobutylaluminum, TIBA), and an activator-support (fluorided silica-coated alumina) in a 2 L stirred autoclave with continuous output to the loop reactor. The TIBA and dual metallocene solutions were fed as separate streams into a tee upstream of the autoclave where they contacted each other. The activator-support was flushed with isobutane into a tee between the aforementioned tee and the autoclave, contacting the organoaluminum/metallocene mixture just before entering the autoclave. The isobutane flush used to transport the activator-support into the autoclave was set at a rate that would result in a residence time of approximately 25 minutes in the autoclave. The total flow from the autoclave then entered the loop reactor.

Ethylene used was polymerization grade ethylene which was purified through a column of alumina (activated at 250° C. in nitrogen). 1-Hexene was polymerization grade 1-hexene (obtained from Chevron Phillips Chemical Company) which was purified by nitrogen purging and storage over 13-X molecular sieve activated at 250° C. (482° F.) in nitrogen. The loop reactor was a liquid full, 15.2 cm diameter, loop reactor, having a volume of 23 gallons (87 liters). Liquid isobutane was used as the diluent. Hydrogen was added at about 1-2 mlb/hr to regulate the molecular weight and/or HLMI of the polymer product. The isobutane was polymerization grade isobutane (obtained from Chevron Phillips Chemical Company) that was further purified by distillation and subsequently passed through a column of alumina (activated at 250° C. in nitrogen).

Reactor conditions included a reactor pressure around 590 psig, a mol % ethylene of 11-13% (based on isobutane diluent), and a polymerization temperature of 90-91° C. Also, the reactor was operated to have a residence time of about 1.25 hr. Metallocene concentrations in the reactor were within a range of about 1.4 to 2 parts per million (ppm) by weight of the diluent in the polymerization reactor. The activator-support (fluorided silica-coated alumina) was fed to the reactor at the rate of approximately 0.2-0.3 lb per hour. Polymer was removed from the reactor at the rate of about 33 lb/hr and recovered in a flash chamber. A Vulcan dryer was used to dry the polymer under nitrogen at about 60-80° C.

Co-catalyst TIBA was obtained as a one molar solution in heptane, but was further diluted to 1 weight percent. The co-catalyst was added in a concentration in a range of from about 140 to 175 ppm based on the weight of the diluent in the polymerization reactor. The structures for MET 1 and MET 2, used in Examples 2-8, are shown below:

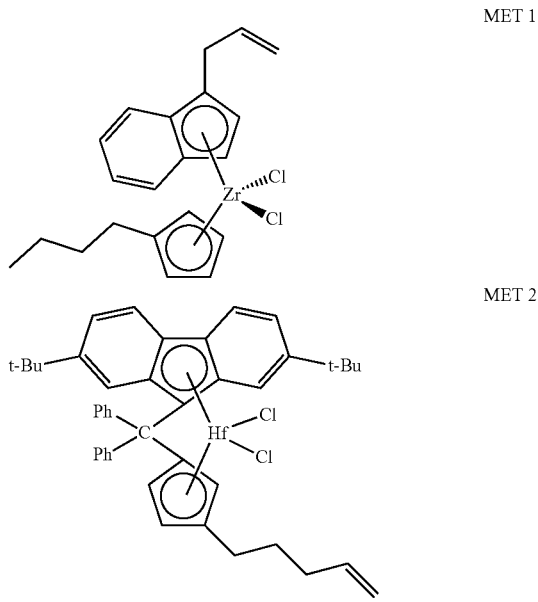

Table I summarizes certain information relating to the polymerization experiments of Examples 2-8.

Examples 1-9

Example 1 was a broad monomodal copolymer resin, having a nominal 5-6 HLMI and 0.954 density, produced using a chromium-based catalyst system (Chevron-Phillips Chemical Company LP). Example 9 was a broad monomodal copolymer resin, having a nominal 8-10 HLMI and 0.948 density, produced using a chromium-based catalyst system (Chevron-Phillips Chemical Company LP). Each of Examples 2-8 utilized a dual catalyst system containing MET 1 and MET 2 at the relative amounts listed in Table I.

Figure 2:
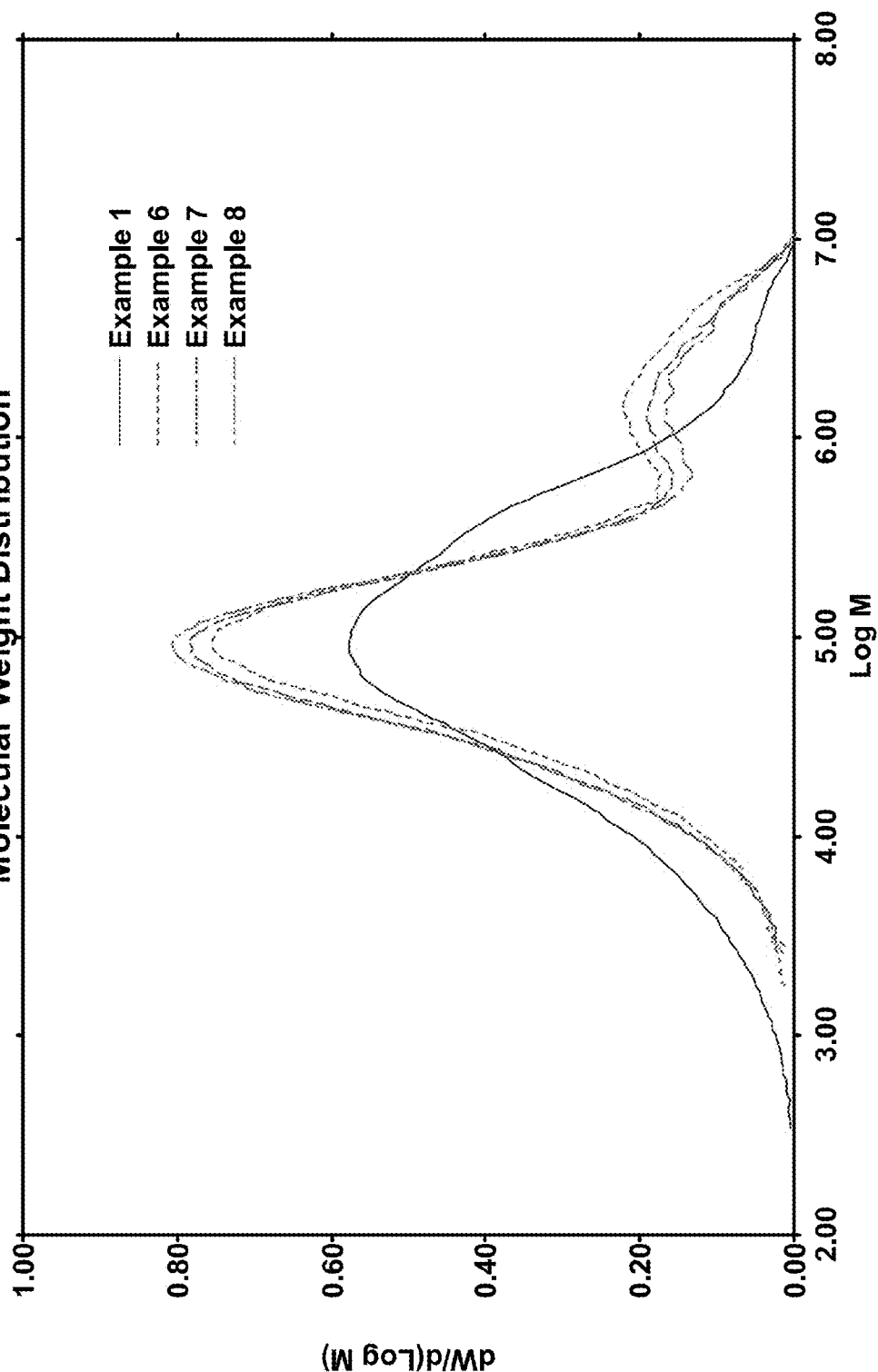
FIG. 2 presents a plot of the molecular weight distributions of the polymers of Examples 1 and 6-8.

FIGS. 1-2 illustrate the bimodal molecular weight distributions (amount of polymer versus the logarithm of molecular weight) of the polymers of Examples 2-8, and Table II summarizes certain molecular weight characteristics of the polymers of Examples 1-8. The polymers of Examples 2-8 had Mp values ranging from about 68,000 to 95,000 g/mol, Mw values ranging from about 370,000 to about 550,000 g/mol, and Mn values ranging from about 30,000 to about 50,000 g/mol. In contrast, the unimodal polymer of Example 1 had lower Mw and Mn values.

Figure 3:
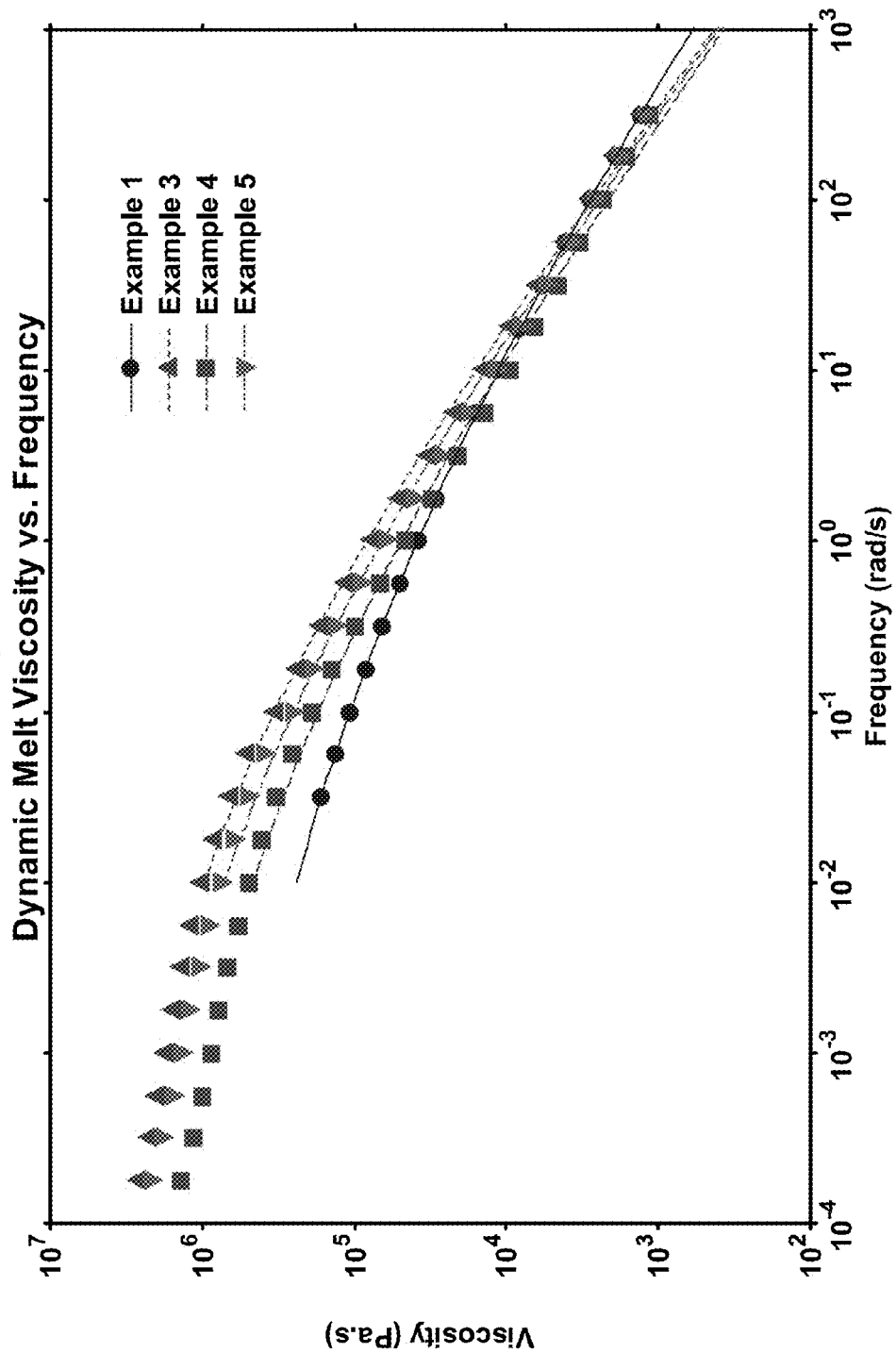
FIG. 3 presents a dynamic rheology plot (viscosity versus frequency) at 190° C. for the polymers of Examples 1 and 3-5.
Figure 4:
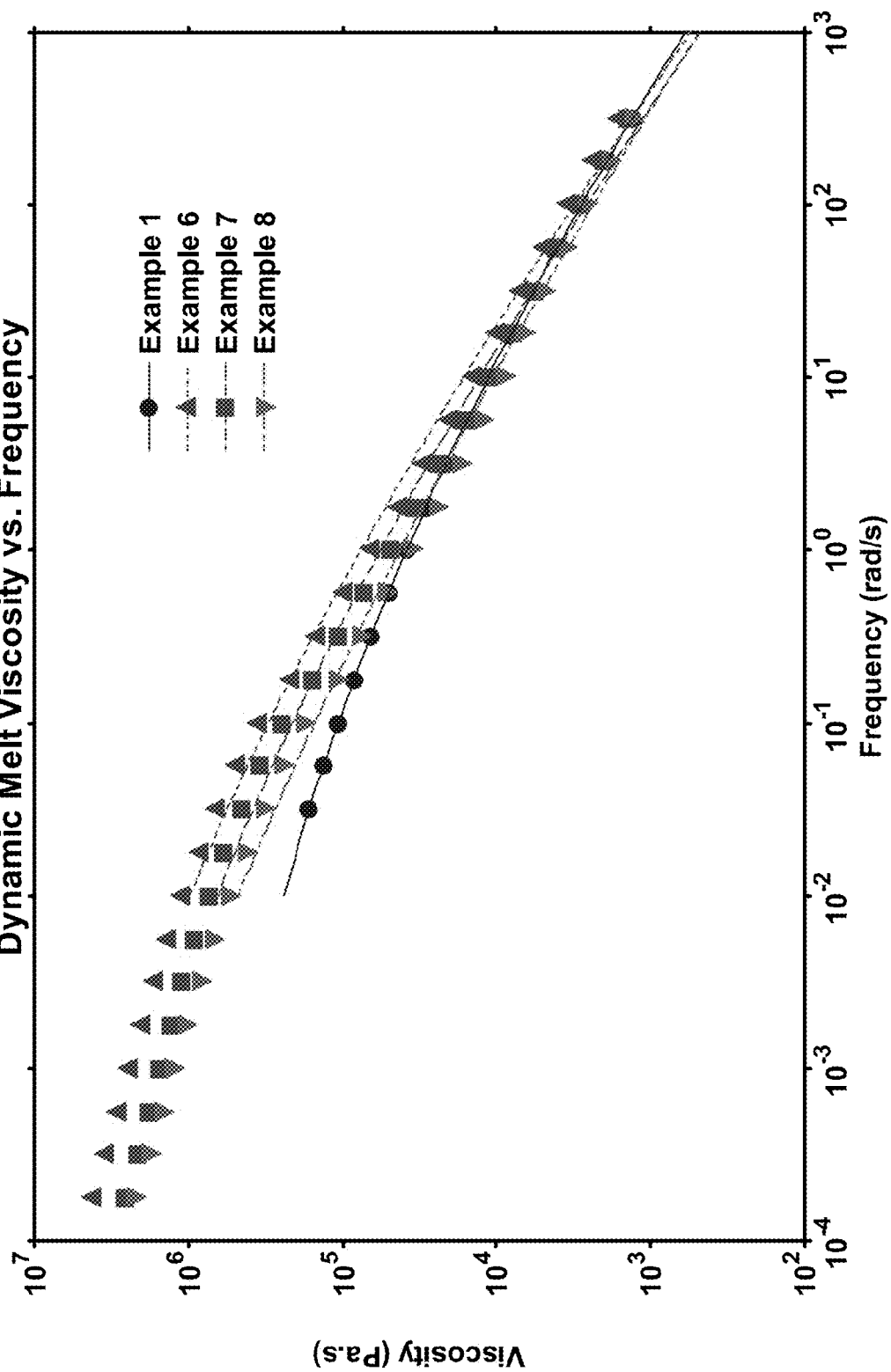
FIG. 4 presents a dynamic rheology plot (viscosity versus frequency) at 190° C. for the polymers of Examples 1 and 6-8.

FIGS. 3-4 illustrate the dynamic rheology properties at 190° C. for the polymers of Examples 1 and 3-8, and Table III summarizes certain rheological characteristics of the polymers of Examples 1-8. Surprisingly, metallocene-based polymers (Examples 2-8) were produced having roughly equivalent processability to that of a chromium-based polymer (Example 1), and with equivalent or superior melt strength (e.g., as reflected in the zero-shear viscosity). The Carreau-Yasuda (CY) model was used for Example 1, while the CY model with creep adjustment was used for Examples 2-8.

FIG. 5 illustrates the low levels of LCB of the polymers consistent with aspects of this invention. The radius of gyration versus the logarithm of the molecular weight for a linear standard and the polymers of Examples 4, 5, and 7, with data from SEC-MALS, is provided in FIG. 5. These polymers were substantially linear with minimal amounts of LCB, e.g., less than about 0.01 LCB, or less than about 0.008 LCB, etc., per 1000 total carbon atoms in the 500,000 to 5,000,000 g/mol molecular weight range, or in the 500,000 to 2,000,000 g/mol molecular weight range, of the polymer.

Table IV summarizes certain polymer and mechanical/performance properties of Examples 1-9, while Table V summarizes the blow molding performance of Examples 1-9. The polymers of Examples 2-8 had densities ranging from about 0.950 to 0.958 g/cm$^3$ and HLMI's ranging from about 3 to about 10 g/10 min; these characteristics were similar to those of Examples 1 and 9. Unexpectedly, however, the ESCR and impact (Charpy and Tensile) properties of Examples 2-8 were far superior to those of Examples 1 and 9; for instance, the ESCR performance was at least 10 times better. Hence, the polymers described herein can provide improved toughness, impact strength, and ESCR at an equivalent (or higher) density and/or HLMI, as compared to chromium-based resins.

The test results in Table V indicate that the polymers of Examples 2-8, unexpectedly, processed similarly to those of the chromium-based polymers of Examples 1 and 9, for example, with similar hang time, part weight, and layflat bottom results in representative blow molding experiments. Using Example 1 as a benchmark, the polymers of Examples 2-8 also had surprisingly similar die swell and weight swell. These results confirm the chromium-like processability of the polymers of Examples 2-8 under commercial blow molding conditions.

TABLE I

Examples 2-8-Polymerization Data and Polymer HLMI and Density

| Example | MET 1/MET 2 (ppm) | H$_2$ Feed (mlb/hr) | C$_2$H$_4$ (mol %) | 1-hexene (mlb/lb C$_2$H$_4$) | TIBA (ppm) | HLMI (g/10 min) | Density (g/cc) |
|---|---|---|---|---|---|---|---|
| 2 | 0.68/1.29 | 1.75 | 12.34 | 1.8 | 154 | 3.35 | 0.9546 |
| 3 | 0.77/1.23 | 1.75 | 12.17 | 2.3 | 153 | 4.73 | 0.9566 |
| 4 | 0.68/1.09 | 1.75 | 11.19 | 3.7 | 146 | 9.70 | 0.9548 |
| 5 | 0.54/0.99 | 1.75 | 12.06 | 3.5 | 142 | 6.78 | 0.9542 |
| 6 | 0.56/0.93 | 1 | 12.06 | 2.5 | 153 | 3.36 | 0.9521 |
| 7 | 0.71/0.97 | 1 | 11.86 | 3.5 | 170 | 4.77 | 0.9534 |
| 8 | 0.65/0.79 | 1 | 11.38 | 3.8 | 160 | 6.58 | 0.9528 |

TABLE II

Examples 1-8-Molecular Weight Characterization (g/mol)

| Example | Mn/1000 | Mw/1000 | Mz/1000 | My/1000 | Mp/1000 | Mw/Mn | Mz/Mw | IB | Ivc |
|---|---|---|---|---|---|---|---|---|---|
| 1 | 19.25 | 299.6 | 1945 | 217.1 | 84.3 | 15.56 | 6.49 | 1.729 | 2.96 |
| 2 | 38.07 | 539.2 | 2582 | 384.7 | 69.0 | 14.16 | 4.79 | 1.537 | 4.48 |
| 3 | 35.08 | 472.0 | 2496 | 332.3 | 70.8 | 13.45 | 5.29 | 1.481 | 4.03 |
| 4 | 33.03 | 377.3 | 2119 | 265.6 | 69.0 | 11.42 | 5.62 | 1.385 | 3.42 |
| 5 | 34.44 | 421.1 | 2241 | 297.7 | 70.8 | 12.23 | 5.32 | 1.409 | 3.72 |
| 6 | 47.41 | 512.4 | 2754 | 363.3 | 91.7 | 10.81 | 5.37 | 1.325 | 4.30 |
| 7 | 48.31 | 441.9 | 2646 | 310.1 | 94.1 | 9.15 | 5.99 | 1.274 | 3.83 |
| 8 | 46.61 | 424.8 | 2781 | 294.4 | 91.7 | 9.11 | 6.55 | 1.240 | 3.69 |

TABLE III

Examples 1-8-Rheological Characterization at 190° C.

| Example | Zero shear (Pa-sec) | Tau(η) (sec) | CY-a parameter | η @ 0.1 (Pa-sec) | Tan d @ 0.1 (degrees) | η @ 100 (Pa-sec) | Tan d @ 100 (degrees) |
|---|---|---|---|---|---|---|---|
| 1 | 1.82E+06 | 7.53E+00 | 0.1927 | 1.07E+05 | 1.3860 | 2.83E+03 | 0.6353 |
| 2 | 4.68E+06 | 6.91E+01 | 0.4159 | 4.65E+05 | 0.8136 | 3.22E+03 | 0.3284 |
| 3 | 3.67E+06 | 6.06E+01 | 0.3710 | 3.37E+05 | 0.8789 | 2.71E+03 | 0.3475 |

TABLE III-continued

Examples 1-8-Rheological Characterization at 190° C.

| Example | Zero shear Tau(η) (Pa-sec) | Tau(η) (sec) | CY-a parameter | η @ 0.1 (Pa-sec) | Tan d @ 0.1 (degrees) | η @ 100 (Pa-sec) | Tan d @ 100 (degrees) |
|---|---|---|---|---|---|---|---|
| 4 | 2.78E+06 | 4.36E+01 | 0.2686 | 1.73E+05 | 1.0350 | 2.15E+03 | 0.4323 |
| 5 | 3.95E+06 | 6.61E+01 | 0.3036 | 2.52E+05 | 0.9294 | 2.47E+03 | 0.3864 |
| 6 | 2.33E+07 | 3.35E+02 | 0.2154 | 3.05E+05 | 0.8356 | 3.14E+03 | 0.4331 |
| 7 | 1.56E+07 | 2.15E+02 | 0.1992 | 2.13E+05 | 0.9089 | 2.62E+03 | 0.4714 |
| 8 | 8.67E+07 | 8.21E+02 | 0.1326 | 1.53E+05 | 0.9233 | 2.38E+03 | 0.5725 |

TABLE IV

Examples 1-9 - HLMI, Density, and Mechanical/Performance Properties

| Example | Density (g/cc) | HLMI (g/10 min) | Charpy (kJ/m$^2$) | Tensile Impact (kJ/m$^2$) | ESCR (condition B, 10%, hr) |
|---|---|---|---|---|---|
| 1 | 0.9547 | 6.28 | 24.65 | 420 | 102 |
| 2 | 0.9546 | 3.35 | 61.02 | >733 | >1000 |
| 3 | 0.9566 | 4.73 | 51.49 | >733 | >1000 |
| 4 | 0.9548 | 9.70 | 33.27 | 505 | >1000 |
| 5 | 0.9542 | 6.78 | 37.84 | 691 | >1000 |
| 6 | 0.9521 | 3.36 | 59.13 | >733 | >1000 |
| 7 | 0.9534 | 4.77 | 48.44 | 633 | >1000 |
| 8 | 0.9528 | 6.58 | 39.80 | 578 | >1000 |
| 9 | 0.9485 | 7.97 | 6.98 | 283 | 101 |

TABLE V

Examples 1-9 - Blow Molding Performance Comparison

| Example | Hang Time (sec) | Part Weight (g) | Weight Swell (Δ vs. Ex. 1, %) | Layflat Bottom (in) | Die Swell (Δ vs. Ex. 1, %) |
|---|---|---|---|---|---|
| 1 | 21.5 | 2335 | Base Line | 10.5 | Base Line |
| 2 | 28.0 | 1774 | −0.24 | 9.5 | −0.10 |
| 3 | 21.4 | 1789 | −0.23 | 8.7 | −0.17 |
| 4 | 10.9 | 2033 | −0.13 | 9.3 | −0.11 |
| 5 | 17.4 | 1892 | −0.19 | 8.8 | −0.16 |
| 6 | 28.1 | 2298 | −0.02 | 9.9 | −0.06 |
| 7 | 16.4 | 2294 | −0.02 | 9.9 | −0.06 |
| 8 | 12.2 | 2427 | 0.04 | 10.6 | 0.01 |
| 9 | 27.8 | 2176 | −0.07 | 9.9 | −0.06 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1. An ethylene polymer having a density of greater than or equal to about 0.945 g/cm$^3$, a high load melt index (HLMI) in a range from about 1 to about 25 g/10 min, a peak molecular weight (Mp) in a range from about 52,000 to about 132,000 g/mol, and an environmental stress crack resistance (ESCR) of at least 250 hours.

Embodiment 2. An ethylene polymer having a density of greater than or equal to about 0.945 g/cm$^3$, a high load melt index (HLMI) in a range from about 1 to about 25 g/10 min, a weight-average molecular weight (Mw) in a range from about 275,000 to about 800,000 g/mol, a number-average molecular weight (Mn) in a range from about 20,000 to about 60,000 g/mol, and a ratio of Mw/Mn in a range from about 5 to about 22.

Embodiment 3. The polymer defined in embodiment 1 or 2, wherein the ethylene polymer has an environmental stress crack resistance (ESCR) in any range disclosed herein, e.g., at least 250 hours, at least 500 hours, at least 1,000 hours, at least 1,500 hours, at least 2,000 hours, etc.

Embodiment 4. The polymer defined in any one of embodiments 1-3, wherein the ethylene polymer has a melt index (MI) in any range disclosed herein, e.g., from 0 to about 0.5, from 0 to about 0.25, from 0 to about 0.2, from 0 to about 0.1 g/10 min, etc.

Embodiment 5. The polymer defined in any one of embodiments 1-4, wherein the ethylene polymer has a HLMI in any range disclosed herein, e.g., from about 1 to about 20, from about 2 to about 25, from about 2 to about 20, from about 2 to about 15, from about 1 to about 10, from about 2 to about 10 g/10 min, etc.

Embodiment 6. The polymer defined in any one of embodiments 1-5, wherein the ethylene polymer has a density in any range disclosed herein, e.g., greater than or equal to about 0.952, from about 0.945 to about 0.965, from about 0.947 to about 0.962, from about 0.95 to about 0.965, from about 0.952 to about 0.962, from about 0.952 to about 0.96 g/cm$^3$, etc.

Embodiment 7. The polymer defined in any one of embodiments 1-6, wherein the ethylene polymer has less than about 0.008 long chain branches (LCB) per 1000 total carbon atoms, e.g., less than about 0.005 LCB, less than about 0.003 LCB, etc.

Embodiment 8. The polymer defined in any one of embodiments 1-7, wherein the ethylene polymer has a Tensile Impact in any range disclosed herein, e.g., greater than or equal to about 400, greater than or equal to about 450, greater than or equal to about 500, greater than or equal to about 550, greater than or equal to about 600 kJ/m$^2$, etc.

Embodiment 9. The polymer defined in any one of embodiments 1-8, wherein the ethylene polymer has a Charpy Impact in any range disclosed herein, e.g., from about 25 to about 75, from about 30 to about 75, from about 25 to about 70, from about 30 to about 70, from about 30 to about 65, from about 28 to about 68 kJ/m$^2$, etc.

Embodiment 10. The polymer defined in any one of embodiments 1-9, wherein the ethylene polymer has a reverse comonomer distribution, e.g., the number of short chain branches (SCB) per 1000 total carbon atoms of the polymer at Mw is greater than at Mn, the number of short chain branches (SCB) per 1000 total carbon atoms of the polymer at Mz is greater than at Mw, the number of SCB per 1000 total carbon atoms of the polymer at Mz is greater than at Mn, the number of short chain branches (SCB) per 1000 total carbon atoms of the polymer at a molecular weight of 10$^6$ is greater than at a molecular weight of 10$^5$, etc.

Embodiment 11. The polymer defined in any one of embodiments 1-10, wherein the ethylene polymer has a Mp in any range disclosed herein, e.g., from about 50,000 to about 130,000, from about 52,000 to about 132,000, from about 65,000 to about 120,000, from about 60,000 to about 130,000, from about 60,000 to about 120,000, from about 65,000 to about 115,000 g/mol, etc.

Embodiment 12. The polymer defined in any one of embodiments 1-11, wherein the ethylene polymer has a Mw in any range disclosed herein, e.g., from about 300,000 to about 750,000, from about 325,000 to about 650,000, from about 325,000 to about 600,000, from about 325,000 to about 575,000, from about 325,000 to about 550,000, from about 350,000 to about 750,000, from about 375,000 to about 650,000, from about 375,000 to about 550,000 g/mol, etc.

Embodiment 13. The polymer defined in any one of embodiments 1-12, wherein the ethylene polymer has a Mn in any range disclosed herein, e.g., from about 20,000 to about 55,000, from about 25,000 to about 60,000, from about 25,000 to about 55,000, from about 30,000 to about 60,000, from about 30,000 to about 55,000, from about 30,000 to about 50,000 g/mol, etc.

Embodiment 14. The polymer defined in any one of embodiments 1-13, wherein the ethylene polymer has a Mz in any range disclosed herein, e.g., from about 1,500,000 to about 10,000,000, from about 1,750,000 to about 7,500,000, from about 1,750,000 to about 5,000,000, from about 1,750,000 to about 4,000,000, from about 2,000,000 to about 4,000,000 g/mol, etc.

Embodiment 15. The polymer defined in any one of embodiments 1-14, wherein the ethylene polymer has a ratio of Mw/Mn in any range disclosed herein, e.g., from about 5 to about 22, from about 5 to about 20, from about 6 to about 18, from about 7 to about 20, from about 7 to about 15, etc.

Embodiment 16. The polymer defined in any one of embodiments 1-15, wherein the ethylene polymer has a ratio of Mz/Mw in any range disclosed herein, e.g., from about 3.5 to about 8.5, from about 4 to about 8, from about 4 to about 7, etc.

Embodiment 17. The polymer defined in any one of embodiments 1-16, wherein the ethylene polymer has a CY-a parameter in any range disclosed herein, e.g., from about 0.06 to about 0.45, from about 0.08 to about 0.4, from about 0.1 to about 0.35, etc.

Embodiment 18. The polymer defined in any one of embodiments 1-17, wherein the ethylene polymer has a zero-shear viscosity in any range disclosed herein, e.g., greater than or equal to about $5 \times 10^5$, greater than or equal to about $7.5 \times 10^5$, greater than or equal to about $1 \times 10^6$, in a range from about $1 \times 10^6$ to about $1 \times 10^9$ Pa-sec, etc.

Embodiment 19. The polymer defined in any one of embodiments 1-18, wherein the ethylene polymer has a viscosity at 100 sec$^{-1}$ (eta @ 100 or $\eta$@ 100) in any range disclosed herein, e.g., from about 1800 to about 4000, from about 2000 to about 4000, from about 1800 to about 3800, from about 2000 to about 3800, from about 1800 to about 3500, from about 2000 to about 3500 Pa-sec, etc.

Embodiment 20. The polymer defined in any one of embodiments 1-19, wherein the ethylene polymer has a hang time in any range disclosed herein, e.g., from about 10 to about 40, from about 10 to about 35, from about 12 to about 40, from about 14 to about 40, from about 14 to about 35, from about 12 to about 35, from about 14 to about 30 sec, etc.

Embodiment 21. The polymer defined in any one of embodiments 1-20, wherein the ethylene polymer has a part weight in any range disclosed herein, e.g., from about 1700 to about 3000, from about 1800 to about 2600, from about 1700 to about 2600, from about 1700 to about 2500, from about 1800 to about 2500 g, etc.

Embodiment 22. The polymer defined in any one of embodiments 1-21, wherein the ethylene polymer has a layflat in any range disclosed herein, e.g., from about 8 to about 12, from about 8 to about 11, from about 9 to about 12, from about 9 to about 11 inches, etc.

Embodiment 23. The polymer defined in any one of embodiments 1-22, wherein the ethylene polymer has a bimodal molecular weight distribution.

Embodiment 24. The polymer defined in any one of embodiments 1-23, wherein the ethylene polymer is a single reactor product, e.g., not a post-reactor blend of two polymers, for instance, having different molecular weight characteristics.

Embodiment 25. The polymer defined in any one of embodiments 1-24, wherein the ethylene polymer is an ethylene/α-olefin copolymer.

Embodiment 26. The polymer defined in any one of embodiments 1-25, wherein the ethylene polymer is an ethylene/1-butene copolymer, an ethylene/1-hexene copolymer, or an ethylene/1-octene copolymer.

Embodiment 27. The polymer defined in any one of embodiments 1-26, wherein the ethylene polymer is an ethylene/1-hexene copolymer.

Embodiment 28. An article comprising the ethylene polymer defined in any one of embodiments 1-27.

Embodiment 29. An article comprising the ethylene polymer defined in any one of embodiments 1-27, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Embodiment 30. A catalyst composition comprising: catalyst component I comprising any unbridged metallocene compound disclosed herein, catalyst component II comprising any bridged metallocene compound disclosed herein, any activator disclosed herein, and optionally, any co-catalyst disclosed herein.

Embodiment 31. The composition defined in embodiment 30, wherein catalyst component II comprises a bridged zirconium or hafnium based metallocene compound.

Embodiment 32. The composition defined in embodiment 30, wherein catalyst component II comprises a bridged zirconium or hafnium based metallocene compound with an alkenyl substituent.

Embodiment 33. The composition defined in embodiment 30, wherein catalyst component II comprises a bridged zirconium or hafnium based metallocene compound with an alkenyl substituent and a fluorenyl group.

Embodiment 34. The composition defined in embodiment 30, wherein catalyst component II comprises a bridged zirconium or hafnium based metallocene compound with a cyclopentadienyl group and a fluorenyl group, and with an alkenyl substituent on the bridging group and/or on the cyclopentadienyl group.

Embodiment 35. The composition defined in embodiment 30, wherein catalyst component II comprises a bridged metallocene compound having an aryl group substituent on the bridging group.

Embodiment 36. The composition defined in embodiment 30, wherein catalyst component II comprises a dinuclear bridged metallocene compound with an alkenyl linking group.

Embodiment 37. The composition defined in embodiment 30, wherein catalyst component II comprises a bridged metallocene compound having formula (II):

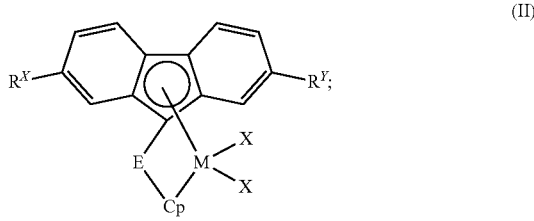

wherein M is any Group IV transition metal disclosed herein, Cp is any cyclopentadienyl, indenyl, or fluorenyl group disclosed herein, each X independently is any monoanionic ligand disclosed herein, $R^X$ and $R^Y$ independently are any substituent disclosed herein, and E is any bridging group disclosed herein.

Embodiment 38. The composition defined in any one of embodiments 30-37, wherein catalyst component I comprises an unbridged zirconium or hafnium based metallocene compound containing two cyclopentadienyl groups, two indenyl groups, or a cyclopentadienyl and an indenyl group.

Embodiment 39. The composition defined in any one of embodiments 30-37, wherein catalyst component I comprises an unbridged zirconium or hafnium based metallocene compound containing two cyclopentadienyl groups.

Embodiment 40. The composition defined in any one of embodiments 30-37, wherein catalyst component I comprises an unbridged zirconium or hafnium based metallocene compound containing two indenyl groups.

Embodiment 41. The composition defined in any one of embodiments 30-37, wherein catalyst component I comprises an unbridged zirconium or hafnium based metallocene compound containing a cyclopentadienyl and an indenyl group.

Embodiment 42. The composition defined in any one of embodiments 30-37, wherein catalyst component I comprises a dinuclear unbridged metallocene compound with an alkenyl linking group.

Embodiment 43. The composition defined in any one of embodiments 30-37, wherein catalyst component I comprises an unbridged metallocene compound having formula (I):

wherein M is any Group IV transition metal disclosed herein, $Cp^A$ and $Cp^B$ independently are any cyclopentadienyl or indenyl group disclosed herein, and each X independently is any monoanionic ligand disclosed herein.

Embodiment 44. The composition defined in any one of embodiments 30-43, wherein the activator comprises an activator-support, an aluminoxane compound, an organoboron or organoborate compound, an ionizing ionic compound, or any combination thereof.

Embodiment 45. The composition defined in any one of embodiments 30-44, wherein the activator comprises an aluminoxane compound.

Embodiment 46. The composition defined in any one of embodiments 30-44, wherein the activator comprises an organoboron or organoborate compound.

Embodiment 47. The composition defined in any one of embodiments 30-44, wherein the activator comprises an ionizing ionic compound.

Embodiment 48. The composition defined in any one of embodiments 30-44, wherein the activator comprises an activator-support, the activator-support comprising any solid oxide treated with any electron-withdrawing anion disclosed herein.

Embodiment 49. The composition defined in any one of embodiments 30-44, wherein the activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 50. The composition defined in any one of embodiments 30-44, wherein the activator comprises fluorided alumina, sulfated alumina, fluorided silica-alumina, sulfated silica-alumina, fluorided silica-coated alumina, sulfated silica-coated alumina, or any combination thereof.

Embodiment 51. The composition defined in any one of embodiments 30-44, wherein the activator comprises a fluorided solid oxide and/or a sulfated solid oxide.

Embodiment 52. The composition defined in any one of embodiments 48-51, wherein the activator further comprises any metal or metal ion disclosed herein, e.g., zinc, nickel, vanadium, titanium, silver, copper, gallium, tin, tungsten, molybdenum, zirconium, or any combination thereof.

Embodiment 53. The composition defined in any one of embodiments 30-52, wherein the catalyst composition comprises a co-catalyst, e.g., any co-catalyst disclosed herein.

Embodiment 54. The composition defined in any one of embodiments 30-53, wherein the co-catalyst comprises any organoaluminum compound disclosed herein.

Embodiment 55. The composition defined in embodiment 54, wherein the organoaluminum compound comprises trimethylaluminum, triethylaluminum, triisobutylaluminum, or a combination thereof.

Embodiment 56. The composition defined in any one of embodiments 48-55, wherein the catalyst composition comprises catalyst component I, catalyst component II, a solid oxide treated with an electron-withdrawing anion, and an organoaluminum compound.

Embodiment 57. The composition defined in any one of embodiments 48-56, wherein the catalyst composition is substantially free of aluminoxane compounds, organoboron or organoborate compounds, ionizing ionic compounds, or combinations thereof.

Embodiment 58. The composition defined in any one of embodiments 30-57, wherein a weight ratio of catalyst component I to catalyst component II in the catalyst composition is in any range disclosed herein, e.g., from about 10:1 to about 1:10, from about 5:1 to about 1:5, from about 2:1 to about 1:2, etc.

Embodiment 59. The composition defined in any one of embodiments 30-58, wherein the catalyst composition is produced by a process comprising contacting, in any order, catalyst component I, catalyst component II, and the activator.

Embodiment 60. The composition defined in any one of embodiments 30-58, wherein the catalyst composition is produced by a process comprising contacting, in any order, catalyst component I, catalyst component II, the activator, and the co-catalyst.

Embodiment 61. The composition defined in any one of embodiments 30-60, wherein a catalyst activity of the catalyst composition is in any range disclosed herein, e.g., from about 150 to about 10,000, from about 500 to about 7,500, from about 1,000 to about 5,000 grams, etc., of ethylene polymer per gram of activator-support per hour, under slurry polymerization conditions, with a triisobutylaluminum co-catalyst, using isobutane as a diluent, and with a polymerization temperature of 90° C. and a reactor pressure of 390 psig.

Embodiment 62. An olefin polymerization process, the process comprising contacting the catalyst composition defined in any one of embodiments 30-61 with an olefin monomer and an optional olefin comonomer in a polymerization reactor system under polymerization conditions to produce an olefin polymer.

Embodiment 63. The process defined in embodiment 62, wherein the olefin monomer comprises any olefin monomer disclosed herein, e.g., any $C_2$-$C_{20}$ olefin.

Embodiment 64. The process defined in embodiment 62 or 63, wherein the olefin monomer and the optional olefin comonomer independently comprise a $C_2$-$C_{20}$ alpha-olefin.

Embodiment 65. The process defined in any one of embodiments 62-64, wherein the olefin monomer comprises ethylene.

Embodiment 66. The process defined in any one of embodiments 62-65, wherein the catalyst composition is contacted with ethylene and an olefin comonomer comprising a $C_3$-$C_{10}$ alpha-olefin.

Embodiment 67. The process defined in any one of embodiments 62-66, wherein the catalyst composition is contacted with ethylene and an olefin comonomer comprising 1-butene, 1-hexene, 1-octene, or a mixture thereof.

Embodiment 68. The process defined in any one of embodiments 62-64, wherein the olefin monomer comprises propylene.

Embodiment 69. The process defined in any one of embodiments 62-68, wherein the polymerization reactor system comprises a batch reactor, a slurry reactor, a gas-phase reactor, a solution reactor, a high pressure reactor, a tubular reactor, an autoclave reactor, or a combination thereof.

Embodiment 70. The process defined in any one of embodiments 62-69, wherein the polymerization reactor system comprises a slurry reactor, a gas-phase reactor, a solution reactor, or a combination thereof.

Embodiment 71. The process defined in any one of embodiments 62-70, wherein the polymerization reactor system comprises a loop slurry reactor.

Embodiment 72. The process defined in any one of embodiments 62-71, wherein the polymerization reactor system comprises a single reactor.

Embodiment 73. The process defined in any one of embodiments 62-71, wherein the polymerization reactor system comprises 2 reactors.

Embodiment 74. The process defined in any one of embodiments 62-71, wherein the polymerization reactor system comprises more than 2 reactors.

Embodiment 75. The process defined in any one of embodiments 62-74, wherein the olefin polymer comprises any olefin polymer disclosed herein.

Embodiment 76. The process defined in any one of embodiments 62-67 and 69-75, wherein the olefin polymer is an ethylene homopolymer, an ethylene/1-butene copolymer, an ethylene/1-hexene copolymer, or an ethylene/1-octene copolymer.

Embodiment 77. The process defined in any one of embodiments 62-67 and 69-75, wherein the olefin polymer is an ethylene/1-hexene copolymer.

Embodiment 78. The process defined in any one of embodiments 62-64 and 68-75, wherein the olefin polymer is a polypropylene homopolymer or a propylene-based copolymer.

Embodiment 79. The process defined in any one of embodiments 62-78, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 80. The process defined in any one of embodiments 62-79, wherein the polymerization conditions are substantially constant, e.g., for a particular polymer grade.

Embodiment 81. The process defined in any one of embodiments 62-80, wherein no hydrogen is added to the polymerization reactor system.

Embodiment 82. The process defined in any one of embodiments 62-80, wherein hydrogen is added to the polymerization reactor system.

Embodiment 83. The process defined in any one of embodiments 62-82, wherein the olefin polymer produced is defined in any one of embodiments 1-27.

Embodiment 84. An olefin polymer produced by the olefin polymerization process defined in any one of embodiments 62-82.

Embodiment 85. An ethylene polymer defined in any one of embodiments 1-27 produced by the process defined in any one of embodiments 62-82.

Embodiment 86. An article (e.g., a blow molded article) comprising the polymer defined in any one of embodiments 84-85.

Embodiment 87. A method or forming or preparing an article of manufacture comprising an olefin polymer, the method comprising (i) performing the olefin polymerization process defined in any one of embodiments 62-82 to produce an olefin polymer (e.g., the ethylene polymer of any one of embodiments 1-27), and (ii) forming the article of manufacture comprising the olefin polymer, e.g., via any technique disclosed herein.

Embodiment 88. The article defined in any one of embodiments 86-87, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

The invention claimed is:

1. An ethylene/α-olefin copolymer composition having a density in a range from about 0.95 to about 0.965 g/cm$^3$, a high load melt index (HLMI) in a range from about 2 to about 10 g/10 min, a peak molecular weight (Mp) in a range from about 65,000 to about 115,000 g/mol, a Mn in a range from about 30,000 to about 60,000 g/mol, a Mz in a range from about 1,750,000 to about 4,000,000 g/mol, and a ratio of Mw/Mn in a range from about 7 to about 15.

2. An article comprising the copolymer composition of claim 1.

3. The copolymer composition of claim 1, wherein the copolymer composition has:
   an environmental stress crack resistance (ESCR) of at least 500 hours;
   a Tensile Impact in a range from about 450 to about 1000 kJ/m$^2$; and
   a Charpy Impact in a range from about 25 to about 75 kJ/m$^2$.

4. The copolymer composition of claim 1, wherein the copolymer composition has:
   an environmental stress crack resistance (ESCR) of at least 1000 hours;
   a Tensile Impact in a range from about 500 to about 1000 kJ/m$^2$; and
   a Charpy Impact in a range from about 30 to about 70 kJ/m$^2$.

5. The copolymer composition of claim 1, wherein the copolymer composition is an ethylene/1-butene copolymer composition, an ethylene/1-hexene copolymer composition, or an ethylene/1-octene copolymer composition.

6. A blow molded article comprising the copolymer composition of claim 5.

7. The copolymer composition of claim 1, wherein the copolymer composition has a viscosity at 100 sec$^{-1}$ in a range from about 2000 to about 3800 Pa-sec.

8. The copolymer composition of claim 1, wherein the copolymer composition has:
   a bimodal molecular weight distribution; and
   a weight-average molecular weight in a range from about 325,000 to about 575,000 g/mol.

9. The copolymer composition of claim 8, wherein the copolymer composition is an ethylene/1-butene copolymer composition, an ethylene/1-hexene copolymer composition, or an ethylene/1-octene copolymer composition having a density in a range from about 0.952 to about 0.962 g/cm$^3$.

10. A polymerization process comprising:
    contacting a catalyst composition with ethylene and an optional olefin comonomer in a polymerization reactor system under polymerization conditions to produce an ethylene polymer composition; wherein the ethylene polymer composition is characterized by:
    a density of greater than or equal to about 0.945 g/cm$^3$, a high load melt index (HLMI) in a range from about 2 to about 20 g/10 min, a viscosity at 100 sec$^{-1}$ in a range from about 2000 to about 4000 Pa-sec, a weight-average molecular weight (Mw) in a range from about 275,000 to about 800,000 g/mol, a number-average molecular weight (Mn) in a range from about 30,000 to about 60,000 g/mol, and a ratio of Mw/Mn in a range from about 5 to about 22.

11. The process of claim 10, wherein the polymerization reactor system comprises a slurry reactor, a gas-phase reactor, a solution reactor, or a combination thereof.

12. The process of claim 10, wherein the polymerization reactor system comprises a loop slurry reactor.

13. The process of claim 10, wherein the polymerization reactor system comprises one or two reactors.

14. The process of claim 10, wherein the catalyst composition is contacted with ethylene and an olefin comonomer comprising a $C_3$-$C_{10}$ α-olefin.

15. The process of claim 10, wherein the catalyst composition comprises two metallocene compounds, an activator, and an optional co-catalyst.

* * * * *